United States Patent
Mecca et al.

(10) Patent No.: US 10,141,757 B2
(45) Date of Patent: Nov. 27, 2018

(54) MOBILE DEVICE CHARGING STATIONS AND METHODS FOR MAKING SAME

(71) Applicant: JPM Networks LLC, Dallas, TX (US)

(72) Inventors: Joseph Augustine Mecca, Coppell, TX (US); Paul Martin Mecca, Arlington, TX (US)

(73) Assignee: JPM Networks LLC, Dallas, TX (US)

( * ) Notice: Subject to any disclaimer, the term of this patent is extended or adjusted under 35 U.S.C. 154(b) by 0 days.

(21) Appl. No.: 13/743,257

(22) Filed: Jan. 16, 2013

(65) Prior Publication Data

US 2017/0271898 A1    Sep. 21, 2017

Related U.S. Application Data

(63) Continuation of application No. 13/370,240, filed on Feb. 9, 2012.

(51) Int. Cl.
*H02J 7/00* (2006.01)

(52) U.S. Cl.
CPC .......... *H02J 7/0044* (2013.01); *H02J 7/0027* (2013.01); *H02J 7/0022* (2013.01); *H02J 7/0024* (2013.01); *H02J 7/0042* (2013.01)

(58) Field of Classification Search
CPC ...... H02J 7/0022; H02J 7/0024; H02J 7/0027; H02J 7/0042; H02J 7/0044
USPC .......................................... 320/107, 110–115
See application file for complete search history.

(56) References Cited

U.S. PATENT DOCUMENTS

| | | | | |
|---|---|---|---|---|
| 6,504,100 | B2 * | 1/2003 | Lawrence | H02B 1/202 174/100 |
| 6,584,267 | B1 * | 6/2003 | Caveney | G02B 6/4452 385/134 |
| 6,614,978 | B1 * | 9/2003 | Caveney | G02B 6/4452 385/135 |
| 7,116,079 | B2 | 10/2006 | Bayne et al. | |
| 7,701,173 | B2 | 4/2010 | Veselic | |
| 7,876,066 | B2 | 1/2011 | Mori et al. | |
| 8,294,417 | B2 | 10/2012 | Kaye et al. | |
| 8,553,407 | B2 | 10/2013 | Zhou | |
| 8,665,593 | B2 * | 3/2014 | Lev | G06F 1/1632 320/114 |
| 8,833,571 | B2 * | 9/2014 | Anderson | A47F 5/0087 211/126.14 |
| 9,323,288 | B2 * | 4/2016 | Dresser, III | G06F 1/1632 |
| 2004/0007372 | A1 * | 1/2004 | Krietzman | H02G 3/045 174/50 |
| 2006/0254996 | A1 * | 11/2006 | McAfee | A47B 57/10 211/90.02 |
| 2009/0058357 | A1 * | 3/2009 | Saker | B62B 3/1404 320/107 |
| 2009/0157907 | A1 * | 6/2009 | Chapman | H02J 7/0027 710/8 |
| 2010/0133391 | A1 * | 6/2010 | Taylor | H04Q 1/06 248/68.1 |
| 2010/0176762 | A1 * | 7/2010 | Daymude | H02J 7/0044 320/115 |

(Continued)

*Primary Examiner* — Stacy Whitmore
(74) *Attorney, Agent, or Firm* — Spencer C. Patterson

(57) ABSTRACT

A floor stand for supporting one or more mobile device charging stations for charging one or more mobile devices, including a vertical support member having an upper end and a lower end, wherein the one or more mobile device charging stations are supported on the vertical support member.

20 Claims, 14 Drawing Sheets

(56) References Cited

U.S. PATENT DOCUMENTS

| | | | |
|---|---|---|---|
| 2010/0193455 A1* | 8/2010 | Russell | A47B 57/06 |
| | | | 211/90.02 |
| 2011/0025263 A1 | 2/2011 | Gilbert | |
| 2011/0121776 A1* | 5/2011 | Lev | G06F 1/1632 |
| | | | 320/107 |
| 2011/0193524 A1 | 8/2011 | Hazzard et al. | |
| 2011/0200717 A1 | 8/2011 | Lapham | |
| 2012/0234778 A1* | 9/2012 | Anderson | G02B 6/4452 |
| | | | 211/26.2 |
| 2012/0249054 A1 | 10/2012 | King et al. | |
| 2013/0175977 A1 | 7/2013 | Tinaphong et al. | |
| 2013/0175993 A1 | 7/2013 | Chen | |
| 2013/0279109 A1 | 10/2013 | Lindblad et al. | |
| 2014/0103868 A1 | 4/2014 | Gilbert | |
| 2015/0192968 A1 | 7/2015 | Lindblad et al. | |
| 2016/0111902 A1 | 4/2016 | Ergun et al. | |

\* cited by examiner

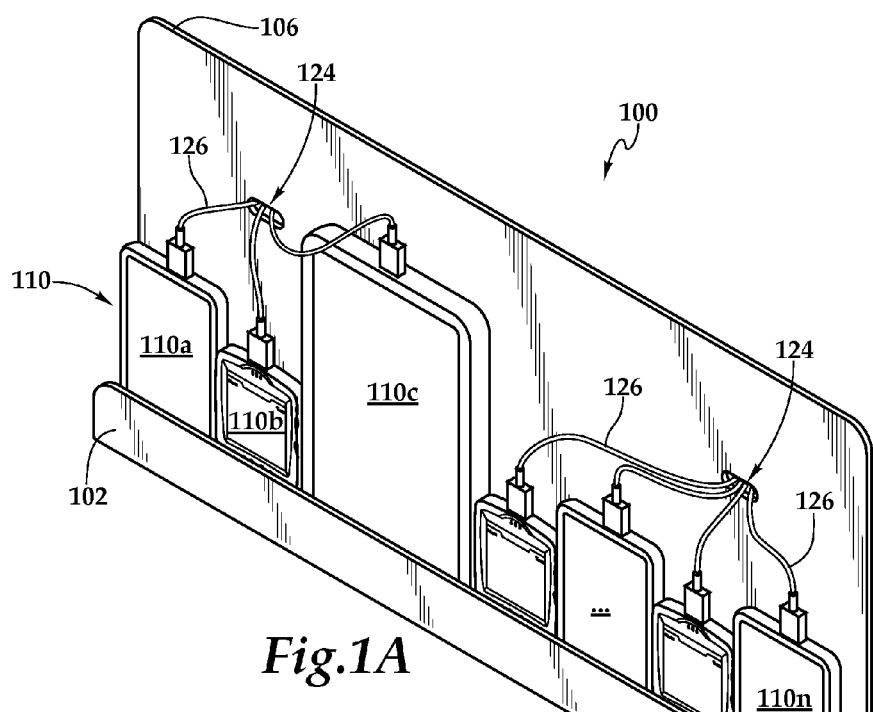
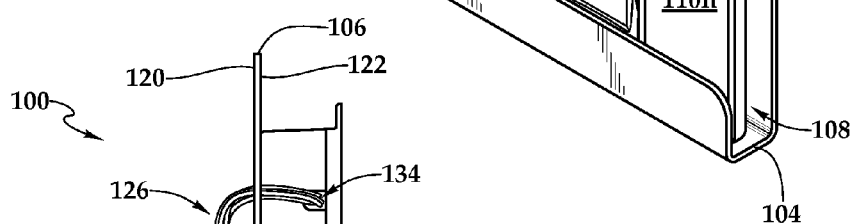
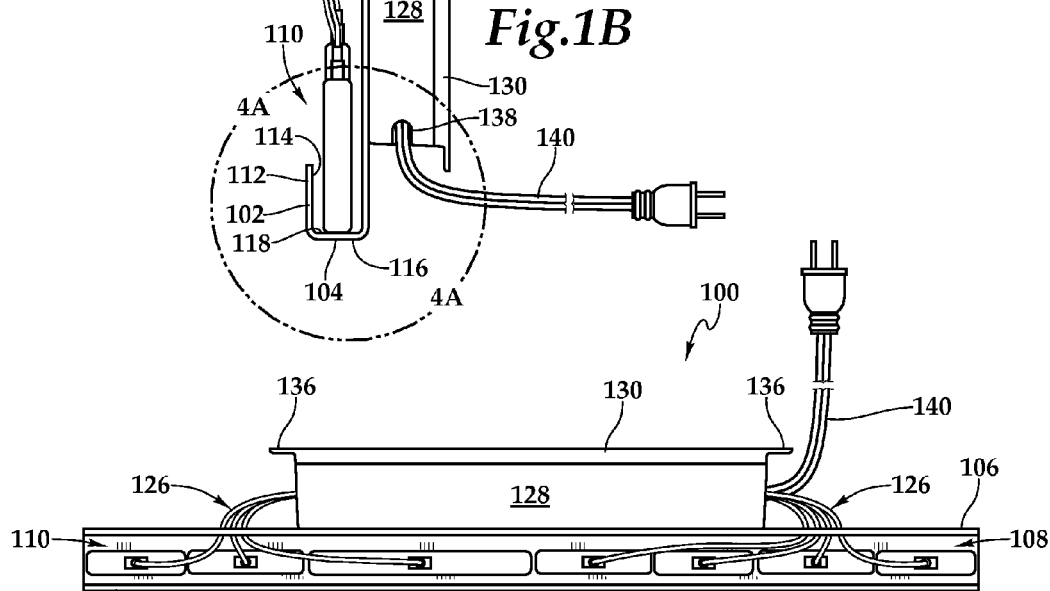
Fig.1A
Fig.1B
Fig.1C

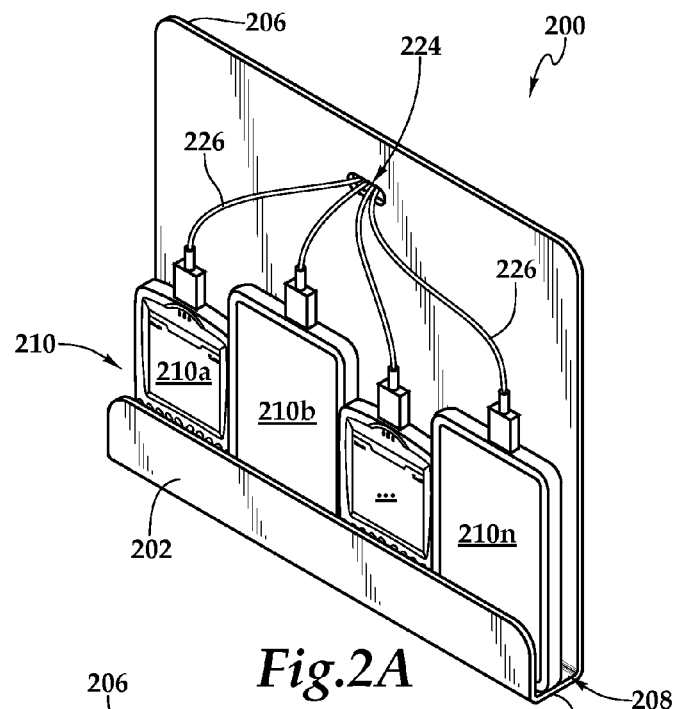
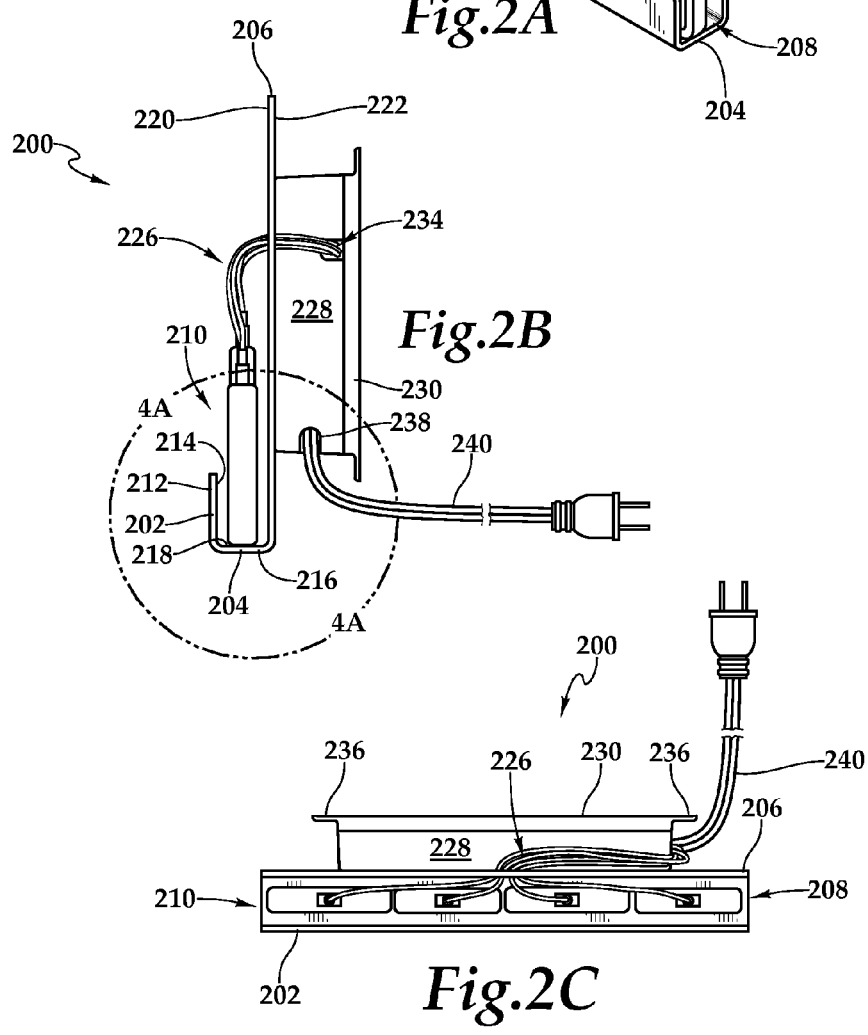
Fig.2A
Fig.2B
Fig.2C

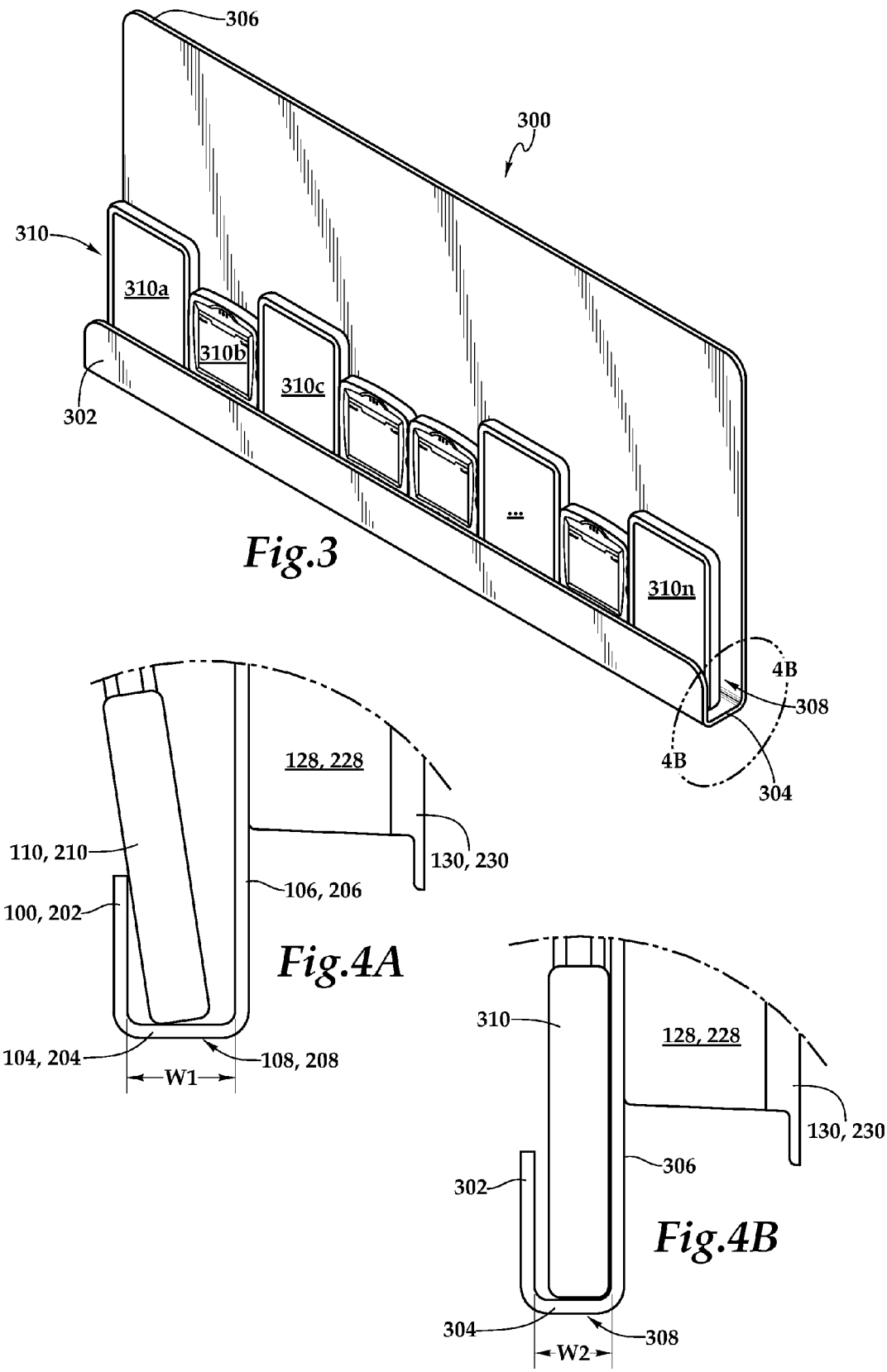

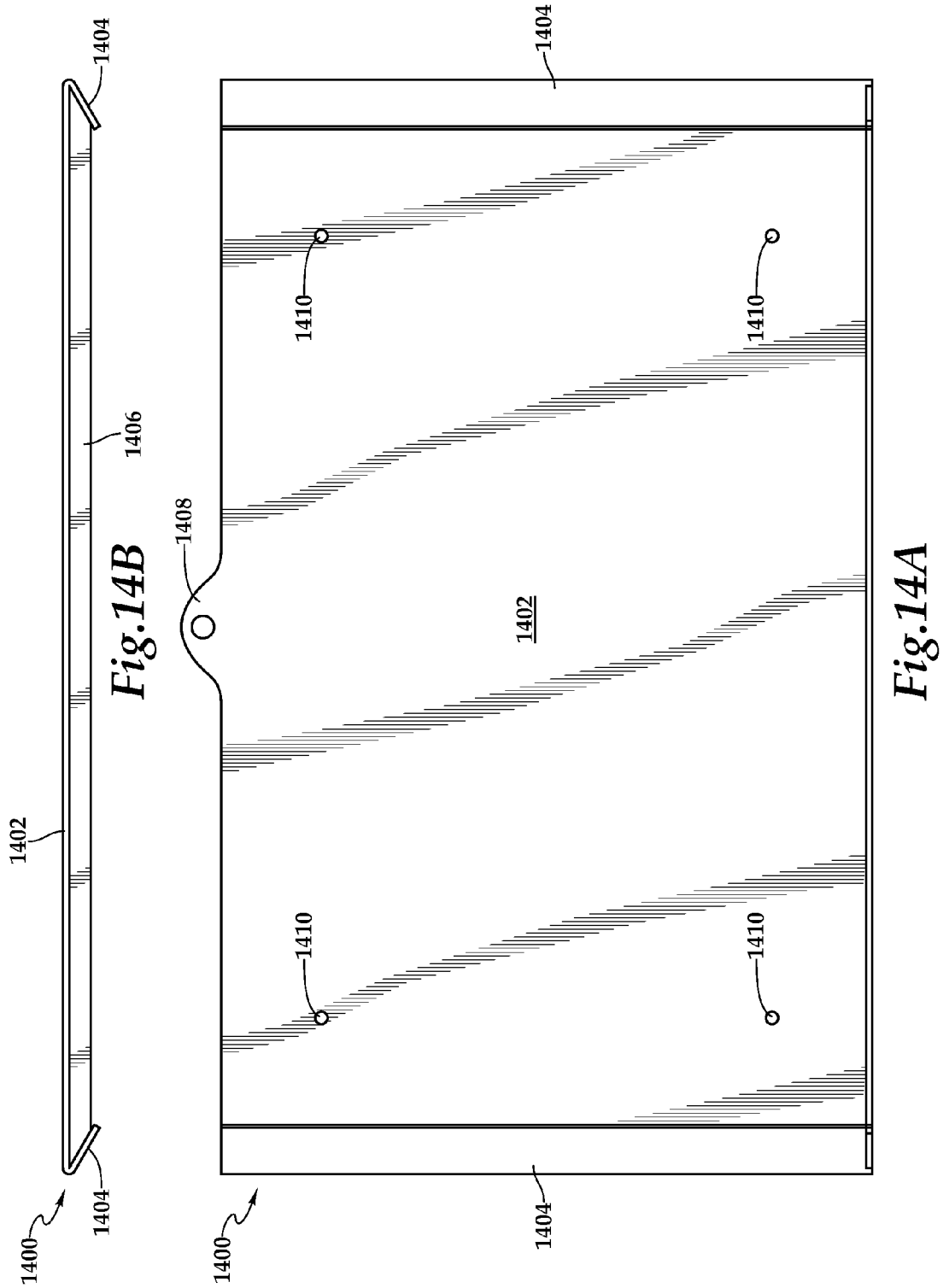

MOBILE DEVICE CHARGING STATIONS AND METHODS FOR MAKING SAME

CROSS-REFERENCE TO RELATED APPLICATIONS

This application is a continuation of prior U.S. patent application Ser. No. 13/370,240, filed Feb. 9, 2012. The entirety of this aforementioned application is incorporated herein by reference.

TECHNICAL FIELD OF THE INVENTION

The invention relates, in general, to mobile device charging stations, in particular, to mobile device charging stations and methods for making same.

BACKGROUND OF THE INVENTION

Without limiting the scope of the present invention, its background will be described with reference to mobile device charging stations, as an example.

Mobile devices, such as mobile phones, MP3 players, smart phones, and the like are ubiquitous these days. Users carry them everywhere and use them constantly, which quickly drains the batteries of these devices. Oftentimes these devices are in need of a charge, but the charging cord is not handy or is in another location.

Several attempts have been made to make remote charging available to users of mobile devices. For example, expensive and complex kiosks are known for charging mobile devices, but they are located in limited locations due to their manufacturing costs and subsequent manufacturer suggested retail price. There are several reasons for the high manufacturing costs. One reason is that they oftentimes include displays for users to view advertisements, commercials, content and the like that an owner of such kiosks desires to present to the users. Displays require additional hardware to support the transmission of such content to the displays, including storage, memory, processors, additional cabling, and the like.

Additionally, when subject matter content is desired to be presented to users of the kiosks, an entity must create and constantly maintain and transmit such content to the electronic displays of these kiosks, thus increasing the complexity and individuals required to maintain the presentation of the content to the users. Further, due to the increased complexity of the hardware required for these kiosks, they must be constantly maintained to ensure proper functioning of the hardware.

Another reason for the higher costs associated with kiosks is that they typically are manufactured with large stand-alone frames constructed out of materials that are expensive. These kiosks have large floor footprints and require large expensive frames, electronics, and panels, which all drive up the manufacturing costs of these kiosks.

In addition, these kiosks typically provide a horizontal shelf for placing mobile devices for charging. Thus, when mobile devices are charging in the kiosks, users are unable to easily see arriving messages and calls on the displays of their mobile devices. Further, since these horizontal shelf provide a limited space, mobile devices must be stacked on top of each other, which can cause damage to the mobile devices and further block the displays from being viewed.

Typically, these kiosks require a high voltage power supply to power their chargers, which can several problems. Two factors considered in the classification of a "high voltage" power source are the possibility of causing a spark in air and the danger of electric shock by contact or proximity. Electrical arcing is a substantial additional risk. High voltage power can also damage devices in the event of a power surge.

SUMMARY OF THE INVENTION

The present invention disclosed herein is directed to stands, mounts, and mobile device charging stations. In one embodiment, the present invention may be directed to a floor stand for supporting one or more mobile device charging stations for charging one or more mobile devices, including a vertical support member having an upper end and a lower end; wherein the one or more mobile device charging stations are supported on the vertical support member.

In one aspect, the floor stand may include a base connected to the lower end of the vertical member for stabilizing the vertical support member in a substantially vertical position. In another aspect, the floor stand may further include a power supply for powering the one or more mobile device charging stations. Additionally, the floor stand may include one or more fasteners located on the vertical support member for fastening the one or more mobile device charging stations to the vertical support member. Further, the one or more mobile charging device stations are supported substantially about the upper end of the vertical support member. In yet another aspect, the floor stand may include one or more tracks located on the vertical support member for slidably engaging with the one or more mobile device charging stations for providing adjustable mounting points for the one or more mobile device charging stations. Also, the floor stand may further include one or more grooves located on the vertical support member for slidably engaging with the one or more mobile device charging stations for providing adjustable mounting points for the one or more mobile device charging stations.

In another embodiment, the present invention may be directed to a floor stand for supporting one or more mobile device charging stations for charging one or more mobile devices, including a vertical support member having an upper end and a lower end; at least one or more mounts located about the vertical support for removably securing the one or more mobile device charging stations.

In one aspect, the one or more mounts may include a substantially planar body having an upper end, a lower end, and two sides, the lower end having retention means for slidably securing the one or more mobile device charging stations. In another aspect, the one or more of the two sides may have retention means for slidably securing the one or more mobile device charging stations. Additionally, the floor stand may further include a power supply for powering the one or more mobile device charging stations. Further, the one or more mounts may be located substantially on opposing sides of the vertical support. In yet another aspect, the one or more mounts may be located substantially above or below one another. Also, the floor stand may further include one or more of the group consisting of tracks and grooves located on the vertical member for slidably engaging with the one or more mounts for providing adjustable mounting points for the one or more mobile device charging stations.

In yet another embodiment, the present invention may be directed to a mount for supporting a mobile device charging station, including a substantially planar body adaptable for mounting to a surface, the substantially planar body having an upper end, lower end, and two sides.

In one aspect, the lower end may include at least one of an inwardly folded portion or slot for slidably receiving the mobile device charging station. In another aspect, one or more of the two sides may include at least one of an inwardly folded portion and slot for slidably receiving the mobile device charging station. In still yet another aspect, the mount may include a locking means for securely retaining the mobile device charging station to the mount. Additionally, the substantially planar body may have at least one hole for accepting a fastener therethrough for securing it to the surface. Further, the mobile device charging station may cover the at least one hole and fastener when the mobile device charging station is slidably secured to the mount.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1A is a perspective view of a mobile device charging station according to an embodiment;

FIG. 1B is a side view of the mobile device charging station of FIG. 1A;

FIG. 1C is a top view of the mobile device charging station of FIG. 1A;

FIG. 2A is a perspective view of a mobile device charging station according to another embodiment;

FIG. 2B is a side view of the mobile device charging station of FIG. 2A;

FIG. 2C is a top view of the mobile device charging station of FIG. 2A;

FIG. 3 is a perspective view of a mobile device charging station having an inductive charging system according to an embodiment;

FIG. 4A is an enlarged partial view of section 4A of FIGS. 1B and 2B according to an embodiment;

FIG. 4B is an enlarged partial view of section 4B of FIG. 3 according to an embodiment;

FIG. 14A is a front view of a wall mount for a mobile device charging station according to an embodiment;

FIG. 14B is a top view of the wall mount for a mobile device charging station of FIG. 14A;

DETAILED DESCRIPTION OF THE INVENTION

Figure 5:
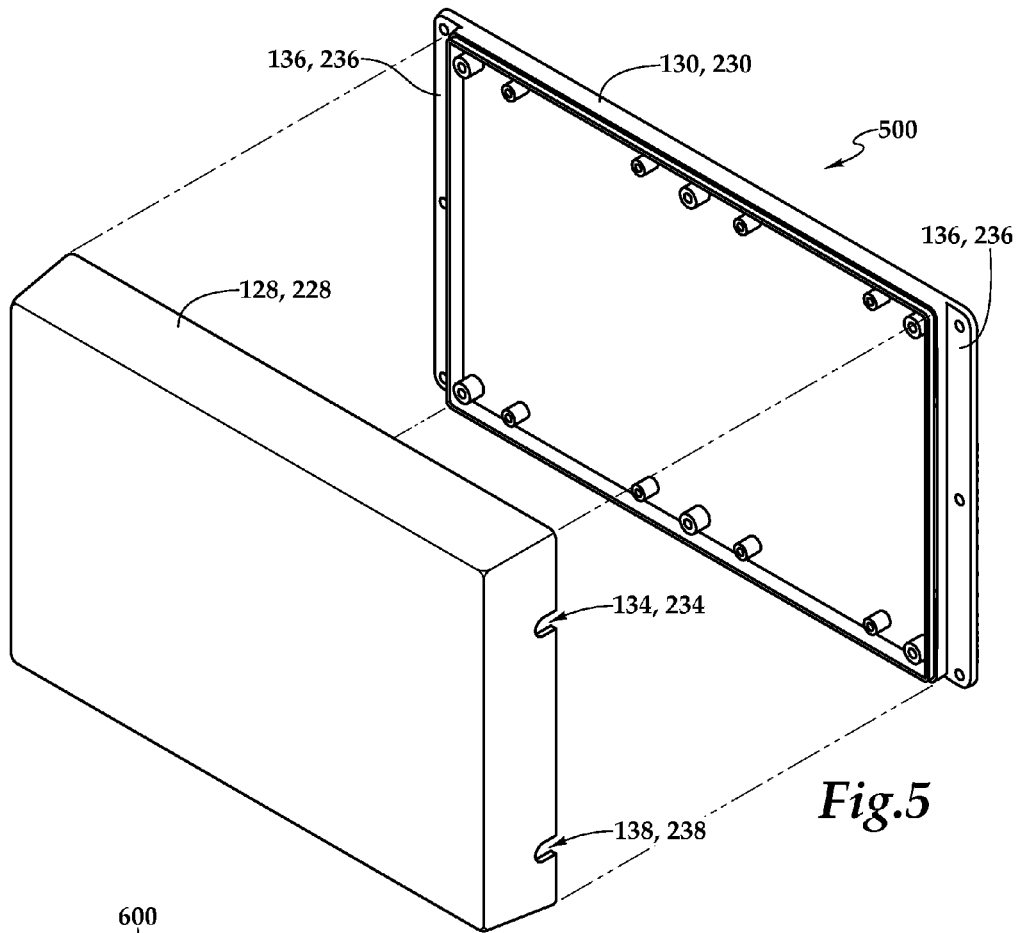
FIG. 5 is an exploded view of a housing and cover of the mobile device charging station of FIGS. 1A-1C, 2A-2C, and 3 according to an embodiment.

While the making and using of various embodiments of the present mobile device charging stations are discussed in detail below, it should be appreciated that the present mobile device charging stations provide many applicable inventive concepts which can be embodied in a wide variety of specific contexts. The specific embodiments discussed herein are merely illustrative of specific ways to make and use the mobile device charging stations, and do not delimit its scope.

Referring initially to FIGS. 1A-1C, therein is depicted a mobile device charging station embodying principles of the present mobile device charging stations that is representatively illustrated and generally designated 100. As shown, mobile device charging station 100 is an 8-port mobile device charging station. Mobile device charging station 100 may include a front member 102, a lower member 104, and a rear member 106 that together preferably form a channel 108 for supporting any type of mobile device, such as an iPhone™ 110a, smartphone 110b, iPad or e-reader 110c, Blackberry™ 110n, MP3 players, and the like (collectively mobile devices 110).

Front member 102 has a front surface 112 that faces outward and a rear surface 114 that faces inward toward channel 108. Lower member 104 has a lower surface 116 that faces outward and an upper surface 118 that faces toward channel 108. Rear member 106 has a front surface 120 that faces forward and a rear surface 122 that faces backward.

Mobile device charging station 100 may further include one or more holes 124 disposed through rear member 106 for placement therethrough of one or more cables 126 for connecting with mobile devices 110. As shown in FIG. 1A, mobile device charging station 100 includes two holes 124 disposed through rear member 106 separated by a space; each hole 124 is shown supporting four cables 126, in one embodiment. As discussed further below, mobile device charging station 100 may include any number of holes 124 and cables 126 for charging any number of mobile devices 110.

Mobile device charging station 100 further includes a housing 128 disposed on rear surface 122 of rear member 106 for housing the electronic circuitry for charging mobile devices 110. In one aspect, the circuitry may be embodied partially or fully on a printed circuit board ("PCB 602"), as shown and discussed further with regards to FIGS. 6-7B below. In one aspect, mobile device charging station 100 may further include a cover 130 for mating with housing 128 for providing a substantially sealed compartment for the PCB 602 and cables 126 as discussed further herein. Mobile device charging station 100 may further include a power cord and an alternating current to direct current ("AC/DC") power converter (collectively power cord 140) for connecting to PCB 602 for powering mobile device charging station 100. Additionally, housing 128 may include one or more voids or holes 134, 138 disposed through housing 128 for accepting one or more cables 126 and/or power cord 140, respectively.

As best shown in FIG. 1C, cover 130 further includes one or more flanges 136 that extend outward from cover 130 for engaging with one or more of the mounts as discussed further herein. Flanges 136 may extend fully or partially the entire length of one or more sides of cover 130.

Front member 102 may be any shape or form, although preferably it is a substantially planar shape. In one embodiment, it has a height sufficient to retain mobile devices 110 within channel 108. Preferably, it's height does not substantially block the entire displays of mobile devices 110. In this regard, a user may charge mobile devices 110 and be able to view the displays of mobile devices 110 to see when a message, call, text, etc. is received at one or more of mobile devices 110 while they are being charged by mobile device charging station 100. Although front member 102 is shown with substantially linear edges, any shape or type of edge may be formed on any of the edges of front member 102. In one embodiment, front member 102 has a height of from about 1 inch to about inches. In another embodiment, front member 102 has a height of from about 1.5 inches to about 2.5 inches. Preferably, front member 102 has a height of approximately 1.5 inches.

Additionally, front member 102 may be of length sufficient to support up to eight mobile devices 110, as shown in FIG. 1A. The number of mobile devices 110 to be charged by mobile device charging station 100 may vary depending on the size of mobile devices 110. In one embodiment, front member 102 has a length of from about 16 inches to about 24 inches. In another embodiment, front member 102 has a length of from about 18 inches to about 20 inches. Preferably, front member 102 has a length of approximately 18 inches.

Front member 102 may have any desirable thickness such that the material it is made from provides sufficient rigidity for supporting one or more mobile devices 110. In one embodiment, front member 102 may have a thickness of from about 0.04 inches to about 0.5 inches. In another embodiment, front member 102 may have a thickness of from about 0.125 inches to about 0.25 inches. Preferably, front member 102 has a thickness of approximately 0.125 inches.

Lower member 104 may be any shape or form, although preferably it is a substantially planar, rounded, and/or curved shape. In one embodiment, it has a width sufficient to provide a distance between front member 102 and rear member 106 to retain mobile devices 110 within channel 108. Preferably, its width provides a sufficient width of channel 108 to accompany the differing widths of an assortment of mobile devices 110 and cases for mobile devices 110 as is known in the art. If the width of lower member 104 is too great, then mobile devices 110 will essentially be positioned in a substantially horizontal position where users would not be able to view the displays of the charging mobile devices 110.

In one embodiment, lower member 104 has a width of from about 0.5 inch to about 2 inches. In another embodiment, lower member 104 has a width of from about 0.75 inches to about 1.5 inches. Preferably, lower member 104 has a width of approximately 1 inch. Additionally, lower member 104 may be of length sufficient to support up to eight mobile devices 110, as shown in FIG. 1A. In one embodiment, lower member 104 has a length of from about 16 inches to about 24 inches. In another embodiment, lower member 104 has a length of from about 18 inches to about 20 inches. Preferably, lower member 104 has a length of approximately 18 inches.

Lower member 104 may have any desirable thickness such that the material it is made from provides sufficient rigidity for supporting one or more mobile devices 110. In one embodiment, lower member 104 may have a thickness of from about 0.04 inches to about 0.5 inches. In another embodiment, lower member 104 may have a thickness of from about 0.125 inches to about 0.25 inches. Preferably, lower member 104 has a thickness of approximately 0.125 inches.

Rear member 106 may be any shape or form, although preferably it is a substantially planar shape. In one embodiment, it has a height sufficient to retain mobile devices 110 within channel 108. Preferably, it's height is greater than front member 102 such that a portion of its front surface 120 extends above the tops of mobile devices 110. All or a portion of front surface 120 provides the surface for adhering or affixing graphics as further discussed herein. Although, rear member 106 is shown with substantially linear edges, any shape or type of edge may be formed on any of the edges of rear member 106. Rear member 106 may have a height of any dimension to accompany a certain desirable form. In one embodiment, rear member 106 has a height of from about 4 inches to about 24 inches. In another embodiment, rear member 106 has a height of from about 6 inches to about 12 inches. Preferably, rear member 106 has a height of approximately 9 inches.

Additionally, rear member 106 may be of length sufficient to support up to eight mobile devices 110, as shown in FIG. 1A. In one embodiment, rear member 106 has a length of from about 16 inches to about 24 inches. In another embodiment, rear member 106 has a length of from about 18 inches to about 20 inches. Preferably, rear member 106 has a length of approximately 18 inches.

Rear member 106 may have any desirable thickness such that the material it is made from provides sufficient rigidity for supporting one or more mobile devices 110. In one embodiment, rear member 106 may have a thickness of from about 0.04 inches to about 0.5 inches. In another embodiment, rear member 106 may have a thickness of from about 0.125 inches to about 0.25 inches. Preferably, rear member 106 has a thickness of approximately 0.125 inches.

With reference now to FIGS. 2A-2C, therein is depicted a mobile device charging station embodying principles of the present mobile device charging stations that is representatively illustrated and generally designated 200. As shown, mobile device charging station 200 is a 4-port mobile device charging station, in one embodiment. Mobile device charging station 200 may include a front member 202, a lower member 204, and a rear member 206 that together preferably form a channel 208 for supporting one or more mobile devices, such as an iPhone™ 210a, smartphone 210b, Blackberry™ 210n, iPads or e-readers, MP3 players, and the like (collectively mobile devices 210).

Front member 202 has a front surface 212 that faces outward and a rear surface 214 that faces inward toward channel 208. Lower member 204 has a lower surface 216 that faces outward and an upper surface 218 that faces toward channel 208. Rear member 206 has a front surface 220 that faces forward and a rear surface 222 that faces backward.

Mobile device charging station 200 may further include one or more holes 224 disposed through rear member 206 for placement therethrough of one or more cables 226 for connecting with mobile devices 210. As shown in FIG. 2A, mobile device charging station 200 includes one hole 224 disposed through rear member 206; hole 224 is shown supporting four cables 226, in one embodiment. As discussed further below, mobile device charging station 200 may include any number of holes 224 and cables 226 for charging any number of mobile devices 210.

Mobile device charging station 200 further includes a housing 228 disposed on rear surface 222 of rear member 206 for housing the electronic circuitry for charging mobile devices 210. In one aspect, the circuitry is embodied partially or fully on PCB 602, as shown and discussed further with regards to FIGS. 6-7b below. In one aspect, mobile device charging station 200 may further include a cover 230 for mating with housing 228 for providing a substantially sealed compartment for the PCB 602 and cables 226 as discussed further herein. Mobile device charging station 200 may further include power cord and an AC/DC power converter (collectively power cord 240) for connecting to PCB 602 for powering mobile device charging station 200. Additionally, housing 228 may include one or more voids or holes 234, 238 disposed through housing 228 for accepting one or more cables 226 and/or power cord 240, respectively.

In one embodiment, cover 230 further includes one or more flanges 236 that extend outward from cover 230 for engaging with one or more of the mounts as discussed further herein. Flanges 236 may extend the entire length of one or more sides of cover 230.

Front member 202 may be any shape or form, although preferably it is a substantially planar shape. In one embodiment, it has a height sufficient to retain mobile devices 210 within channel 208. Preferably, it's height does not substantially block the entire displays of mobile devices 210. In this regard, a user may charge mobile devices 210 and be able to view the displays of mobile devices 210 to see when a message, call, text, etc. is received at one or more of mobile devices 210 while they are being charged by the mobile device charging station 200. Although, front member 202 is shown with substantially linear edges, any shape or type of edge may be formed on any of the edges of front member 202. In one embodiment, front member 202 has a height of from about 1 inch to about 3 inches. In another embodiment, front member 202 has a height of from about 1.5 inches to about 2.5 inches. Preferably, front member 202 has a height of approximately 1.5 inches.

Additionally, front member 202 may be of length sufficient to support up to four mobile devices 210, as shown in FIG. 2A. In one embodiment, front member 202 has a length of from about 8 inches to about 12 inches. In another embodiment, front member 202 has a length of from about 9 inches to about 10 inches. Preferably, front member 202 has a length of approximately 9 inches.

Front member 202 may have any desirable thickness such that the material it is made from provides sufficient rigidity for supporting one or more mobile devices 210. In one embodiment, front member 202 may have a thickness of from about 0.04 inches to about 0.5 inches. In another embodiment, front member 202 may have a thickness of from about 0.125 inches to about 0.25 inches. Preferably, front member 202 has a thickness of approximately 0.125 inches.

Lower member 204 may be any shape or form, although preferably it is a substantially planar, rounded, and/or curved shape. In one embodiment, it has a width sufficient to provide a distance between front member 202 and rear member 206 to retain mobile devices 210 within channel 208. Preferably, its width provides a sufficient width of channel 208 to accompany the differing widths of an assortment of mobile devices 210 and cases for mobile devices 210 as is known in the art. If the width of lower member 204 is too great, then mobile devices 210 will essentially be positioned in a substantially horizontal position where users would not be able to view the displays of the charging mobile devices 210.

In one embodiment, lower member 204 has a width of from about 0.5 inch to about 2 inches. In another embodiment, lower member 204 has a width of from about 0.75 inches to about 1.5 inches. Preferably, lower member 204 has a width of approximately 1 inch. Additionally, lower member 204 may be of length sufficient to support up to four mobile devices 210, as shown in FIG. 2A. In one embodiment, lower member 204 has a length of from about 8 inches to about 12 inches. In another embodiment, lower member 204 has a length of from about 9 inches to about 10 inches. Preferably, lower member 204 has a length of approximately 9 inches.

Lower member 204 may have any desirable thickness such that the material it is made from provides sufficient rigidity for supporting one or more mobile devices 210. In one embodiment, lower member 204 may have a thickness of from about 0.04 inches to about 0.5 inches. In another embodiment, lower member 204 may have a thickness of from about 0.125 inches to about 0.25 inches. Preferably, lower member 204 has a thickness of approximately 0.125 inches.

Rear member 206 may be any shape or form, although preferably it is a substantially planar shape. In one embodiment, it has a height sufficient to retain mobile devices 210 within channel 208. Preferably, it's height is greater than front member 202 such that a portion of its front surface 220 extends above the tops of mobile devices 210. All or a portion of front surface 220 provides the surface for adhering or affixing graphics as further discussed herein. Although, rear member 206 is shown with substantially linear edges, any shape or type of edge may be formed on any of the edges of rear member 206. Rear member 206 may have a height of any dimension to accompany a certain desirable form. In one embodiment, rear member 206 has a height of from about 4 inches to about 24 inches. In another embodiment, rear member 206 has a height of from about 6 inches to about 12 inches. Preferably, rear member 206 has a height of approximately 9 inches.

Additionally, rear member 206 may be of length sufficient to support up to four mobile devices 210, as shown in FIG. 2A. In one embodiment, rear member 206 has a length of from about 8 inches to about 12 inches. In another embodiment, rear member 206 has a length of from about 9 inches to about 10 inches. Preferably, rear member 206 has a length of approximately 9 inches.

Rear member 206 may have any desirable thickness such that the material it is made from provides sufficient rigidity for supporting one or more mobile devices 210. In one embodiment, rear member 206 may have a thickness of from about 0.04 inches to about 0.5 inches. In another embodiment, rear member 206 may have a thickness of from about 0.125 inches to about 0.25 inches. Preferably, rear member 206 has a thickness of approximately 0.125 inches.

Holes 124, 224 may be any size or shape, although holes 124, 224 of mobile device charging stations 100, 200 are preferably oval shaped and sized for accepting the ends of cables 126, 226. In one embodiment, front surface 120, 220 of rear member 106, 206 may be covered with any type of graphics design as discussed further below, and as such the size of holes 124, 224 may be kept to a minimum so as to not detract substantially from the graphics design. In one embodiment, holes 124, 224 may have a width of from about 0.75 inch to about 1 inch and a height of from about 0.25 inch to about 0.5 inch.

Cables 126, 226 may be any type of charging cables typically associated with all types of mobile devices 110, 210, electronic devices, electronic readers, iPads™, etc. In one aspect, cables 126, 226 may include: USB to micro USB cables, USB to mini USB cables, USB to iPhone connector end cables, etc. It is contemplated that any types of cables and connectors may be used with any of mobile device charging stations 100, 200.

Turning now to FIGS. 3A-3C, therein is depicted a mobile device charging station having inductive charging embodying principles of the present mobile device charging stations that is representatively illustrated and generally designated 300. As shown, mobile device charging station 300 is an 8-port mobile device charging station. Mobile device charging station 300 may include a front member 302, a lower member 304, and a rear member 306 that together preferably form a channel 308 for supporting one or more mobile devices, such as an iPhone™ 310a, smartphone 310b, iPad or e-reader 310c, Blackberry™ 310n, and the like (collectively mobile devices 310).

Front member 302 has a front surface that faces outward and a rear surface that faces inward toward channel 308. Lower member 304 has a lower surface that faces outward and an upper surface that faces toward channel 308. Rear member 306 has a front surface that faces forward and a rear surface that faces backward. Although the surfaces are not specifically noted by reference numerals, mobile device charging station 300 includes similar surfaces as described and noted relative to mobile device charging stations 100, 200, thus are not being noted in FIG. 3. In one embodiment, mobile device charging station 300 is an inductive charging mobile device charging station, and thus many of the holes and cables described above relative to mobile device charging stations 100, 200 are not described here.

Mobile device charging station 300 may further include a housing such as, housings 128, 228 disposed on rear surface of rear member 306 for housing the electronic circuitry for charging mobile devices 310. In one aspect, the circuitry may embodied partially or fully in a PCB, in one embodiment. In one aspect, mobile device charging station 300 may further include a cover, such as covers 130, 230 for mating with its housing for providing a substantially sealed compartment to the PCB and circuitry as discussed further herein. Mobile device charging station 300 may further include power cord and an AC/DC power converter for connecting to PCB for powering mobile device charging station 300. Additionally, housing may include one or more holes for accepting a power cord, similar to holes 138, 238 of mobile device charging stations 100, 200.

In one embodiment, cover may further include one or more flanges, such as flanges 136 that extend outward from cover for engaging with one or more of the mounts as discussed further herein. Flanges may extend the entire length of one or more sides of cover.

Front member 302 may be any shape or form, although preferably it is a substantially planar shape. In one embodiment, it has a height sufficient to retain mobile devices 310 within channel 308. Preferably, it's height does not substantially block the entire displays of mobile devices 310. In this regard, a user may charge mobile devices 310 and be able to view the displays of mobile devices 310 to see when a message, call, text, etc. is received at one or more of mobile devices 310 while they are being charged by the mobile device charging station 300. Although, front member 302 is shown with substantially linear edges, any shape or type of edges may be formed on any of the edges of front member 302. In one embodiment, front member 302 has a height of from about 1 inch to about 3 inches. In another embodiment, front member 302 has a height of from about 1.5 inches to about 2.5 inches. Preferably, front member 302 has a height of approximately 1.5 inches.

Additionally, front member 302 may be of length sufficient to support up to eight mobile devices 310, as shown in FIG. 3A. In one embodiment, front member 302 has a length of from about 16 inches to about 24 inches. In another embodiment, front member 302 has a length of from about 18 inches to about 20 inches. Preferably, front member 302 has a length of approximately 18 inches.

Front member 302 may have any desirable thickness such that the material it is made from provides sufficient rigidity for supporting one or more mobile devices 310. In one embodiment, front member 302 may have a thickness of from about 0.04 inches to about 0.5 inches. In another embodiment, front member 302 may have a thickness of from about 0.125 inches to about 0.25 inches. Preferably, front member 302 has a thickness of approximately 0.125 inches.

Lower member 304 may be any shape or form, although preferably it is a substantially planar, rounded, and/or curved shape. In one embodiment, it has a width sufficient to provide a distance between front member 302 and rear member 306 to retain mobile devices 310 within channel 308. Preferably, it's width provides a sufficient width of channel 308 to accompany the differing widths of an assortment of mobile devices 310 and cases for mobile devices 310 as is known in the art. If the width of lower member 304 is too great, then mobile devices 310 will essentially be positioned in a substantially horizontal position where users would not be able to view the displays of the charging mobile devices 310. Preferably, the width of lower member 304 has a width that positions or supports mobile devices 310 snugly or flush against rear member 306 as discussed further with regard to FIG. 4B.

In one embodiment, lower member 304 has a width of from about 0.5 inch to about 2 inches. In another embodiment, lower member 304 has a width of from about 0.75 inches to about 1.5 inches. Preferably, lower member 304 has a width of approximately 0.75 inch. Additionally, lower member 304 may be of length sufficient to support up to eight mobile devices 310, as shown in FIG. 3. In one embodiment, lower member 304 has a length of from about 16 inches to about 24 inches. In another embodiment, lower member 304 has a length of from about 18 inches to about 20 inches. Preferably, lower member 304 has a length of approximately 18 inches.

Lower member 304 may have any desirable thickness such that the material it is made from provides sufficient rigidity for supporting one or more mobile devices 310. In one embodiment, lower member 304 may have a thickness of from about 0.04 inches to about 0.5 inches. In another embodiment, lower member 304 may have a thickness of from about 0.125 inches to about 0.25 inches. Preferably, lower member 304 has a thickness of approximately 0.125 inches.

Rear member 306 may be any shape or form, although preferably it is a substantially planar shape. In one embodiment, it has a height sufficient to retain mobile devices 310 within channel 308. Preferably, it's height is greater than front member 302 such that a portion of its front surface extends above the tops of mobile devices 310. All or a portion of front surface provides the surface for adhering or affixing graphics as further discussed herein. Although, rear member 306 is shown with substantially linear edges, any shape or type of edge may be formed on any of the edges of rear member 306. Rear member 306 may have a height of any dimension to accompany a certain desirable form. In one embodiment, rear member 306 has a height of from about 4 inches to about 24 inches. In another embodiment, rear member 306 has a height of from about 6 inches to about 12 inches. Preferably, rear member 306 has a height of approximately 9 inches.

Additionally, rear member 306 may be of length sufficient to support up to eight mobile devices 310, as shown in FIG. 3A. In one embodiment, rear member 306 has a length of from about 16 inches to about 24 inches. In another embodiment, rear member 306 has a length of from about 18 inches to about 20 inches. Preferably, rear member 306 has a length of approximately 18 inches.

Rear member 306 may have any desirable thickness such that the material it is made from provides sufficient rigidity for supporting one or more mobile devices 310. In one embodiment, rear member 306 may have a thickness of from about 0.04 inches to about 0.5 inches. In another embodiment, rear member 306 may have a thickness of from about 0.125 inches to about 0.25 inches. Preferably, rear member 306 has a thickness of approximately 0.125 inches.

Mobile device charging stations 100, 200, 300 may be used with any number of mobile devices 110, 210, 310 by increasing or decreasing the dimensions of the members and described electronics as discussed herein. For example, mobile device charging stations 100, 200, 300 may have a length sufficient to span an entire length of a wall of a room. In this example, the number of housings 128, 228 and/or PCB 602 may be increased or decreased accordingly to accommodate such desired dimensions of mobile device charging stations 100, 200, 300 for supporting and charging any number of mobile devices 110, 210, 310.

In one embodiment, mobile device charging stations 100, 200, 300 may be formed from a single or unitary piece of material. In another embodiment, mobile device charging stations 100, 200, 300, may be formed from separate or different pieces and then joined together as would be known to those skilled in the art. Mobile device charging stations 100, 200, 300 may be formed from any type of semi-rigid to rigid type of material as desired. For example, mobile device charging stations 100, 200, 300 may be formed from any type of material such as plastics, acrylics, metals, alloys, wood, thermoplastics, extrudable materials, engineering plastics, ABS resins, foams, PVCs, and the like.

Now turning to FIG. 4A, an enlarged partial view of section 4A of FIGS. 1B, 2B showing channels 108, 208 is herein illustrated and described. As shown, channels 108, 208 have a width that provides sufficient space for supporting mobile devices 110, 210 by themselves or with outer cases disposed about them as are commonly known. The width ($W_1$) of channels 108, 208 is sufficient for easy placement of mobile devices 110, 210 within channels 108, 208 while providing a substantially upward position of mobile devices 110, 210 such that users may be able to view the displays on mobile devices 110, 210 while they are being charged. In this way, mobile devices 110, 210 are not stacked on top of each other, but are positioned in a substantially vertical position. The width ($W_1$) of channels 108, 208 may also provide for sufficient space between mobile devices 110, 210 and rear members 106, 206 for disposing one or more lighting devices, such as lighting device 1102 (FIG. 11A) for lighting any graphics disposed on front surfaces 120, 220 of rear members 106, 206 as described further relative to FIG. 11A. Channels 108, 208 preferably have a width ($W_1$) of from about 0.5 inch to about 2 inches. In another embodiment, channel 108 has a width ($W_1$) of from about 0.75 inches to about 1.5 inches. Preferably, channel 108 has a width ($W_1$) of approximately 1 inch.

Referring now to FIG. 4B, an enlarged partial view of section 4B of FIG. 3 showing channel 308 is herein illustrated and described. As shown, channel 308, has a width that provides sufficient space for supporting mobile devices 310 by themselves or with outer cases disposed about them as are commonly known. The width ($W_2$) of channel 308 is sufficient for placement of mobile devices 310 within channel 308 while providing a substantially upward position of mobile devices 310 such that users may be able to view the displays on mobile devices 310 while they are being charged. In addition, channel 308 provides a snugger or tighter fit for mobile devices 310 such that it causes mobile devices 310 to be substantially adjacent to rear member 306 as shown in FIG. 4B, which facilitates a closer distance between the primary coil(s) and secondary coil(s) for efficient inductive charging as described relative to FIGS. 8-9. Additionally, the width ($W_2$) provides support for ensuring that mobile devices 310 are not stacked on top of each other, but are positioned in a substantially vertical position. The width ($W_2$) of channel 308 may also provide for sufficient space between mobile devices 310 and rear member 306 for disposing one or more lighting devices, such as LED strip 1102 (FIG. 11A) for lighting any graphics disposed on front surfaces of rear members 306 as described further relative to FIG. 11A. Channel 308 preferably has a width ($W_2$) of from about 0.5 inch to about 2 inches. In another embodiment, channel 108 has a width (W₂) of from about 0.75 inches to about 1.5 inches. Preferably, channel 108 has a width (W₂) of approximately 0.75 inch.

Turning now to FIG. 5, is an exploded view of housings 128, 228 and covers 130, 230. As shown, housings 128, 228 has a body that when sealed with covers 130, 230 provides a substantially sealed compartment for securing the PCB 602 and cables 126, 226. Further, housings 128, 228 may include one or more holes 134, 234 as pathway through housings 128, 228 for cables 126, 226. Also, housings 128, 228 may include one or more holes 138, 238 for providing a pathway through housings 128, 228 for power cords 140, 240. As mentioned above, holes 138, 238 may also provide a pathway for a power cord for mobile device charging station 300. Covers 130, 230 may include several holes or vias for inserting fasteners, such as screws for securing to housings 128, 228. Any type of fasteners commonly known to those skilled in the arts may be used to secure covers 130, 230 to housings 128, 228.

Additionally, other types of housings and/or compartments may be used for securing PCB 602 and cables 126, 226 to the rear portion of mobile device charging stations 100, 200, 300. Additionally, flanges 136, 236 are shown extending substantially along both vertical edges of covers 130, 230 in one embodiment. In another aspect, mobile device charging stations 100, 200, 300 may include flanges 136, 236 that may extend partially and/or fully down all or any of the edges of either covers 130, 230 or housings 128, 228 as would be understood by those skilled in the arts.

Figure 6:
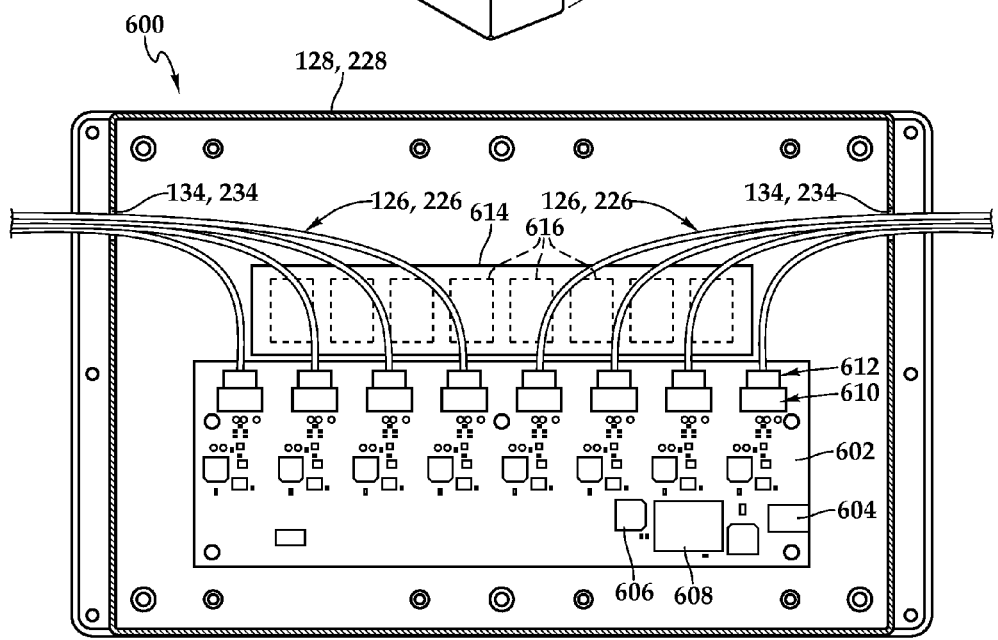
FIG. 6 is a front view of the back of the housing with the cover removed of the mobile device charging station of FIGS. 1A-1C, 2A-2C, and 3 depicting a printed circuit board in communication with a plurality of charging cables according to an embodiment.

FIG. 6 depicts PCB 602 disposed within housings 128, 228. Housings 128, 228 may include one or more standoffs for supporting PCB 602, in one embodiment. PCB 602 includes one or more power jack 604 for connecting with one or more power cords 140, 240 for powering mobile device charging stations 100, 200, 300. Additionally, PCB 602 may include one or more power jack 606 for powering another device associated with mobile device charging stations 100, 200, 300, such as a lighting device 1102 (FIG. 11A), in one embodiment. Further, PCB 602 may include an adjustable power module 608 as further discussed below. PCB 602 may further include one or more jacks 610 for connecting with connectors 612 of cables 126, 226. As shown, housings 128, 228 include holes 134, 234 in one or more locations for supporting cables 126, 226 to be fed through housings 128, 228. In another embodiment, a housing, such as housings 128, 228 may include PCB 602 or another PCB or electronic circuitry for providing inductive charging as further described in regards to FIGS. 8-9.

In another embodiment, FIG. 6 shows a battery pack 614 containing one or more batteries 616 for powering mobile device charging stations 100, 200, 300. Battery pack 614 may be disposed anywhere on mobile device charging stations 100, 200, 300, although it is shown housed in housings 128, 228. Battery pack 614 may include supports, and the like for securing batteries 616 within housings 128, 228 and leads, wirings, contacts, and the like for transmitting power from batteries 616 to PCB 602, in one embodiment.

In another embodiment, housings 128, 228 may include batteries 616 without battery pack 614. In this embodiment, housings 128, 228 may include supports, and the like for securing batteries 616 within housings 128, 228 and leads, wirings, contacts, and the like for transmitting power from batteries 616 to PCB 602.

Additionally, batteries 616 may be any type of batteries commonly known to those skilled in the arts, including rechargeable batteries, consumable batteries, and the like. In the case of rechargeable batteries 616, power cords 140, 240 may be used to transmit power from an outlet, such as an AC outlet to battery pack 614 for recharging rechargeable batteries 616, in one embodiment.

Preferably, mobile device charging stations 100, 200, 300 include a number and voltage of batteries 616 sufficient to power charging mobile devices 110, 210, 310 on mobile device charging stations 100, 200, 300 as described herein.

Figure 7A:
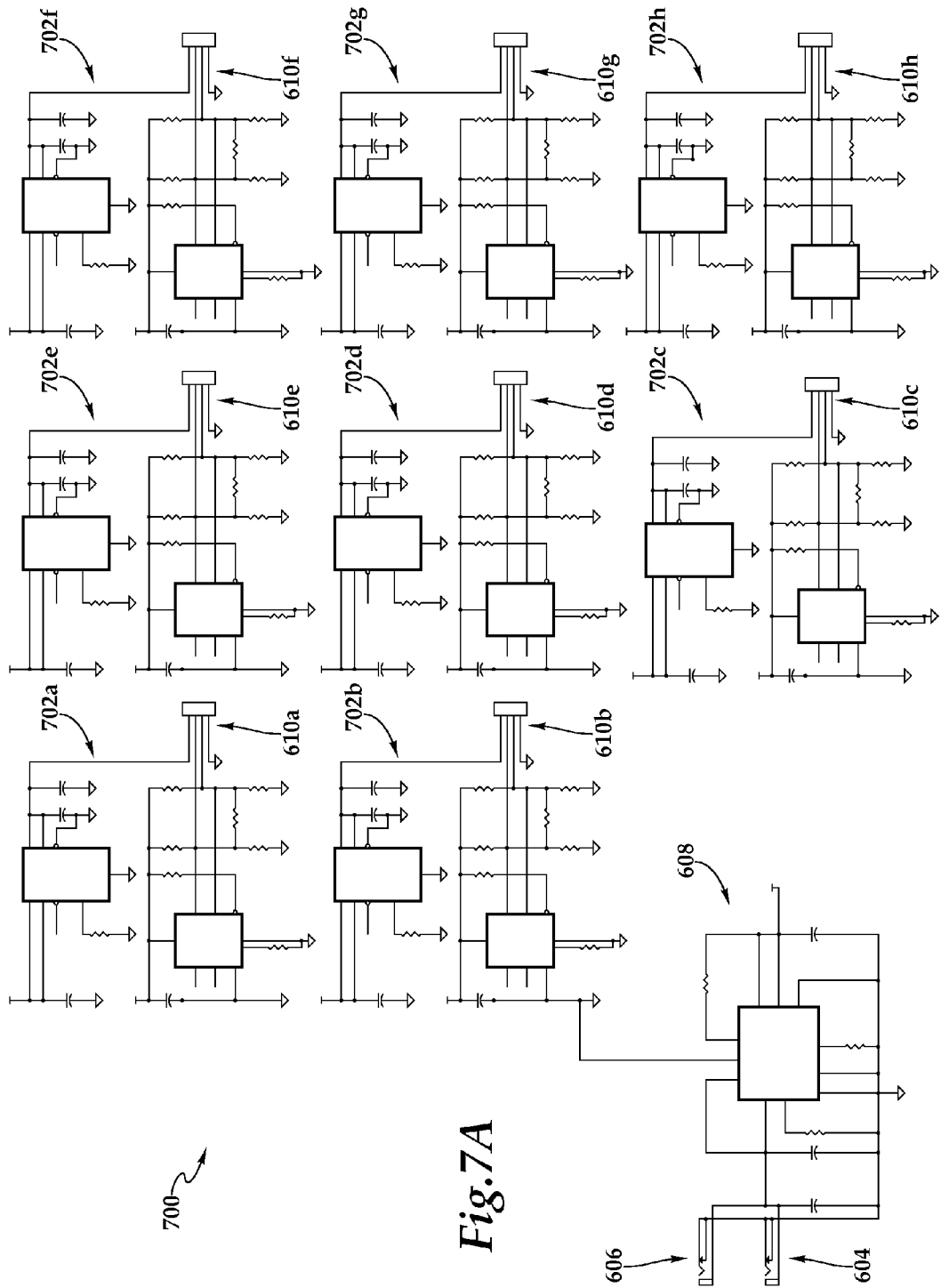
FIG. 7A is an electronic schematic diagram of exemplary circuitry of the printed circuit board of FIG. 6 according to an embodiment.
Figure 7B:
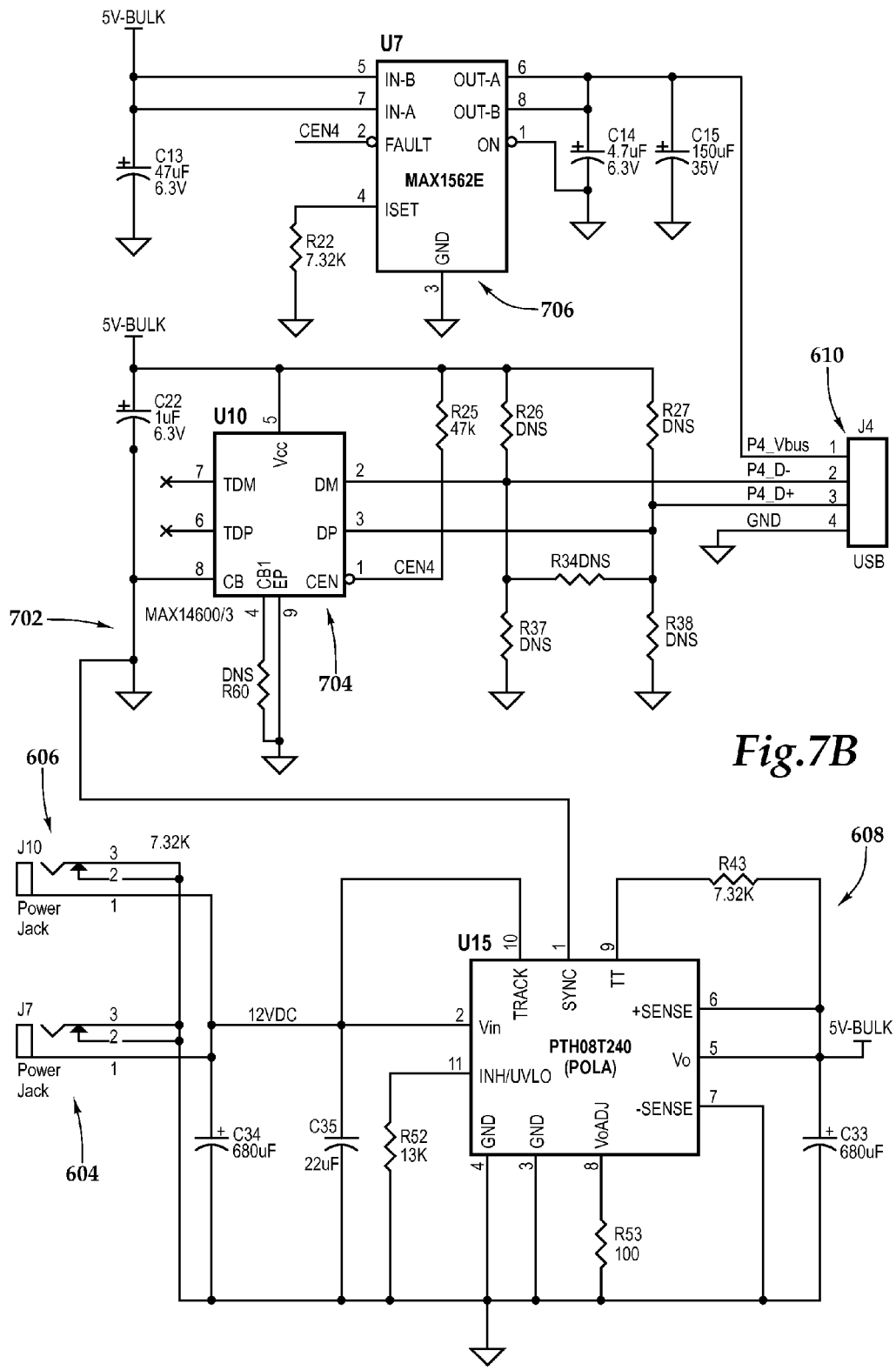
FIG. 7B is an electrical schematic of partial exemplary circuitry of the printed circuit board of FIG. 7A according to an embodiment.

Referring now to FIGS. 7A-7B, a non-limiting, exemplary electronic schematic diagram of an exemplary electronic circuit is depicted embodying principles of the present mobile device charging stations that is representatively illustrated and generally designated 700. Preferably, electronic circuit 700 of mobile device charging stations 100, 200 intelligently indentifies which mobile devices 110, 210 are connected into mobile device charging stations 100, 200 via cables 126, 226 for determining the most efficient charge to provide to mobile devices 110, 210. For example, when mobile devices 110, 210 are connected with cables 126, 226 electronic circuit 700 identifies whether the mobile device 110, 210 is an Apple iPhone or another smartphone, for example, and then provides an efficient charge to that determined particular mobile device 110, 210. In this example, if an iPhone is connected to one of cables 126, 226, then electronic circuit 700 may provide a 1 amp charge to the iPhone for efficient charging. Electronic circuit 700 includes USB Implementers Forum ("USB-IF") specifications, so that it is capable of charging mobile devices 110, 210 in the most efficient way according to each mobile devices 110, 210 manufacturer specifications.

Electronic circuit 700 incorporates an Apple™ certified chip for properly identifying and charging Apple devices, such as iPads, iPhones, iPods, and the like. Additionally, electronic circuit 700 supports other manufacturer mobile devices that are charged via mini-USB and micro-USB connectors. Electronic circuit 700 also provides over-current protection on both ends so that a power surge cannot harm mobile devices 110, 210 while they are charging.

Electronic circuit 700 including associated circuitry and components may be fully or partially incorporated in PCB 602, in one embodiment. In one embodiment, electronic circuit 700 preferably includes power jack 604 for accepting power cords 140, 240. Preferably, power cords 140, 240 are connected to a power supply voltage of 120 volts. Power supplied from power cords 140, 240 to power jack 604 is preferably between 10-20 watts.

As discussed above, electronic circuit 700 preferably includes power module 608 in communication with power jack 604 for providing power to one or more switch/identifiers 702a-702h (collectively switch/identifiers 702). Electronic circuit 700 may include any number of power module 608 and switch/identifiers 702 as desired depending on the power available. In one embodiment, electronic circuit 700 may include 8 switch/identifiers 702. In another embodiment, electronic circuit 700 may include 4 switch/identifiers 702.

Power module 608 is preferably an adjustable power module capable of handling a 4.5 volt to 14 volt input. It also preferably provides up to 10 amps of output current. In one embodiment, power module 608 is a PTH08T240 module manufactured by Texas Instruments.

In one embodiment, power module 608 is in communication with all of switch/identifiers 702 as shown in FIG. 7A. Switch/identifiers 702 preferably includes a USB host charger identification/adapter emulator 704 and a programmable 4 amp USB current-limited switch 706 that are in communication with jacks 610 as shown in FIG. 7B. Preferably, USB host charger identification/adapter emulator 704 is a USB 2.0 host charger identification device, in one embodiment. In one aspect, it provides USB high speed analog switches with a USB adaptor emulator circuit. In one embodiment, USB host charger identification/adapter emulator 704 is a 15602 USB switch host charger manufactured by Maxim.

Switch/identifiers 702 also preferably includes a USB current-limited switch 706 that provides autoreset functionality that latches the switch off if the output is shorted, which saves system power. Additionally, switch/identifiers 702 may provide fault-blanking functionality that enables the circuit to ignore momentary faults, such as when capacitive loads, such as mobile devices 110, 210 are hot swapped in and out of mobile device charging stations 100, 200. In one embodiment, switch/identifiers 702 is a 1562 current limited switch manufactured by Maxim.

Preferably, switch/identifiers 702 provides a USB voltage at each jacks 610 of 4.75-5.25 volts and a maximum USB current at each jacks 610 of 2.1 amps, in one embodiment. Preferably, current output to jacks 610 is limited to 2.1-2.5 amps, individually to each jack 610. If current exceeds this amount, switch/identifiers 702 turns off power to jacks 610. Where the connector ends of cables 126, 226 that connect to mobile devices 110, 210 are micro USB, these cables 126, 226 may be commercially available, UL/FCC listed power supply to provide DC power below 48V to PCB 602. In so doing, PCB 602 will not require UL safety certification for high voltage power. Each jacks 610 complies with the specifications for a Dedicated Charging Power ("DCP") as defined in the USB Battery Charging Specification, as well as Apple specifications for high current charging (iPad). Each jacks 610 supplies regulated ~5V DC, compliant with USB-IF Battery Charging Specifications.

In one embodiment, PCB 602, housings 128, 228, covers 130, 230, and power cords 140, 240 may be a standalone unit for incorporating into an existing charging station and/or kiosk. In yet another embodiment, PCB 602, housings 128, 228, covers 130, 230, cables 126, 226, and power cords 140, 240 may be a standalone unit for incorporating into an existing charging station and/or kiosk.

Figure 8:
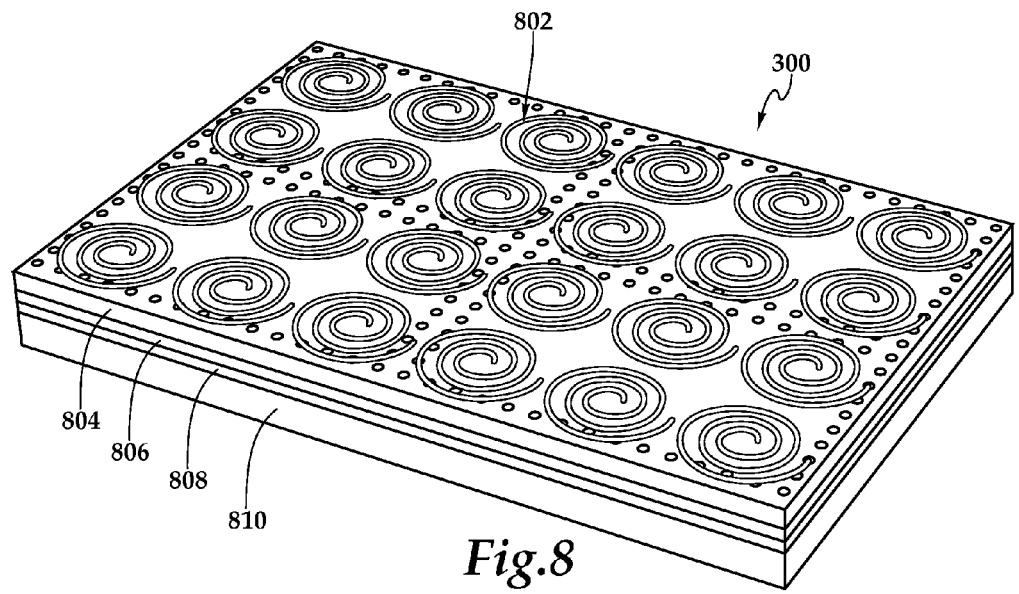
FIG. 8 is a perspective view of an exemplary inductive charging system of the mobile device charging system of FIG. 3 according to an embodiment.

Turning now to FIG. 8, a non-limiting, exemplary inductive charging system is depicted embodying principles of the present mobile device charging stations that is representatively illustrated and generally designated 300. In this embodiment, mobile devices 310 are capable of being charged via an inductive charging system that is part of mobile device charging station 300. Mobile device charging station 300 may incorporate any of the known standards and specifications of wireless charging, including Wireless Power Consortium ("WPC") Qi™ standard.

Mobile device charging station 300 may include one or more primary coils 802 arranged in an array structure about front surface of rear member 306 of mobile device charging station 300. A top insulating sheet or graphic sheet has been removed from the top of mobile device charging station 300 to show the array of one embodiment of primary coils 802. Typically, primary coils 802 will be covered by either a top insulating sheet, a graphic sheet, or both, in one embodiment. In one aspect, primary coils 802 are incorporated or part of a PCB 804.

Mobile device charging station 300 may also include an electromagnetic interference ("EMI") shielding 806 that is disposed beneath primary coils 802, such as a substantially planar ferrite material. Mobile device charging station 300 may also include a conductive material 808 disposed beneath EMI shielding 806. Conductive material 808 may be a conductive material such as a copper sheet and the like.

Disposed beneath conductive material 808 may be a substrate material 810, such as a plastic type material. In one embodiment, PCB 804, EMI shielding 806, conductive material 808, substrate material 810 may make up partially or entirely rear member 306 of mobile device charging station 300.

Figure 9:
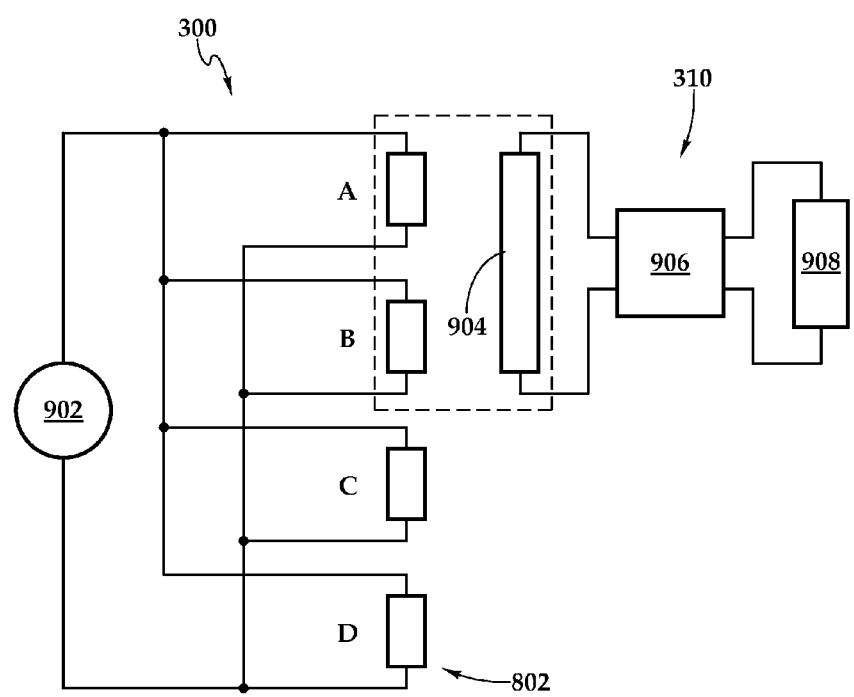
FIG. 9 is an electronic schematic diagram of an exemplary circuitry of the inductive charging system of the mobile device charging station of FIG. 8 according to an embodiment.

Referring now to FIG. 9, a non-limiting, exemplary electronic schematic diagram is depicted embodying principles of the present mobile device charging station 300 and one or more mobile devices 310. Mobile device charging station 300 is shown in close proximity to mobile devices 310, and this is preferable for efficient inductive charging. Mobile device charging station 300 may be powered by AC or DC power supplies 902. Typically, if the power supply 902 is AC, then the circuitry, possibly via a PCB or PCB 602 associated with mobile device charging station 300 may perform an AC to DC power conversion. Next, mobile device charging station 300 may perform a DC to high-frequency AC (~20 kHz to 10 MHz) conversion for supplying it to primary coils 802. If 902 is DC, then mobile device charging station 300 performs the DC to high-frequency conversion as described previously.

Powering primary coils 802 produces a magnetic flux that is transmitted to the secondary coils 904 disposed in mobile devices 310 and/or the cases that enclose mobile devices 310. Mobile devices 310 and/or the cases that enclose mobile devices 310 may further include a rectifier 906 for rectifying the AC voltage to DC voltage for charging the battery 908 of mobile devices 310. Rectifier 906 may be a diode rectifier in one embodiment.

Figure 10A:
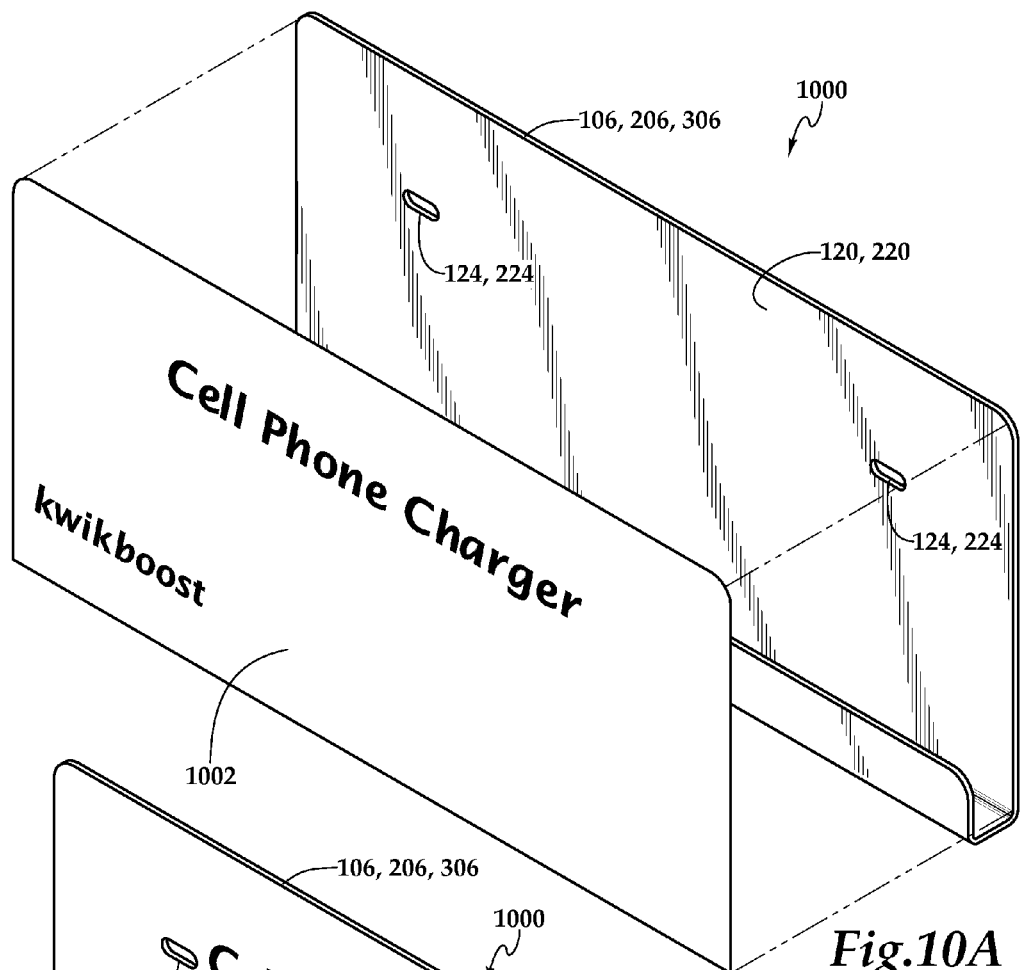
FIG. 10A is a perspective view of a printed graphic sheet adherable/removable to the front surface of the mobile device charging station of FIGS. 1A, 2A, and 3 according to an embodiment.
Figure 10B:
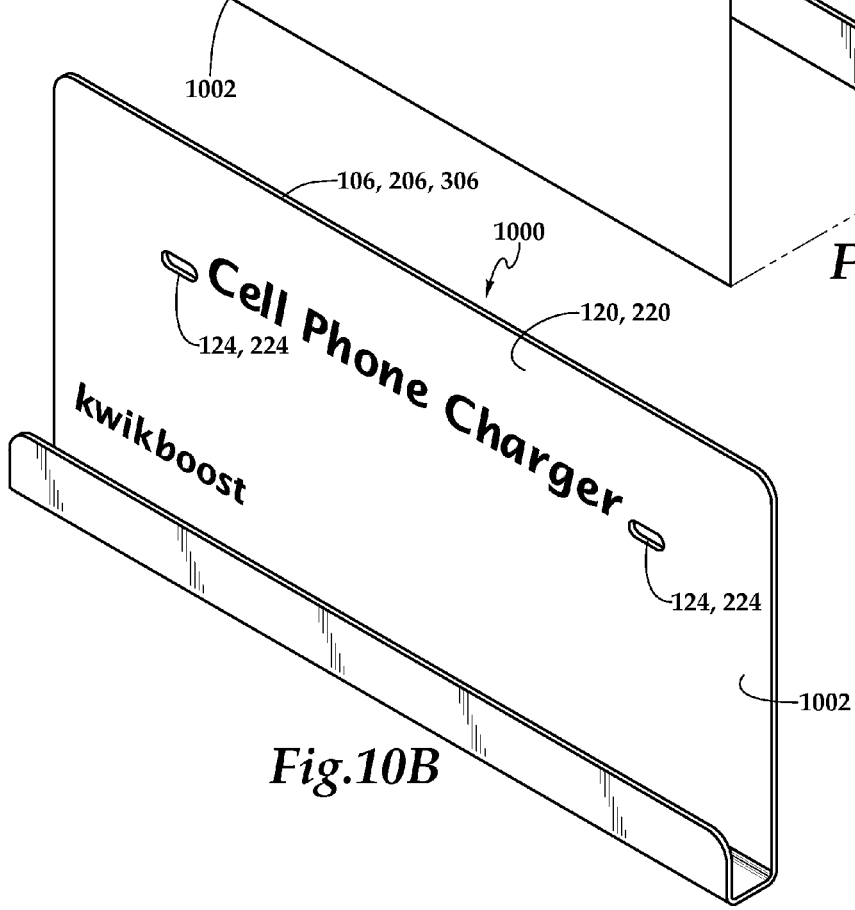
FIG. 10B is a perspective view of the printed graphic sheet adhered to the front surface of the mobile device charging station of FIGS. 1A, 2A, and 3.

Referring now to FIG. 10A, a non-limiting, exemplary graphic sheet adherable to the front of mobile device charging stations 100, 200, 300 is depicted embodying principles of the present mobile device charging stations that is representatively illustrated and generally designated 1000. In one embodiment, mobile device charging stations 100, 200, 300 may include a graphic sheet 1002 that is printed on a printer and then adhered to the front surface of mobile device charging stations 100, 200, 300. Although holes 124, 224 are shown in FIG. 10B, for mobile device charging station 300 these holes may not be formed as there are no charging cables associated with that embodiment. In general, graphic sheet 1002 may have a adhesive backing that enables it to be adhered and later removed at any desired time without having to replace entire panels or members.

In another embodiment, graphic sheet 1002 may include or be a magnetic graphical appliqué having an opposite polarity to magnetic portions disposed on rear members 106, 206, 306 of mobile device charging stations 100, 200, 300 for providing an attractive magnetic force for securing graphic sheet 1002 onto rear members 106, 206, 306 of mobile device charging stations 100, 200, 300.

There are many benefits associated with these features. First, any type of design, advertising, pictures, graphics, and the like may be simply printed on graphic sheet 1002 and then adhered to the front surface of mobile device charging stations 100, 200, 300. Second, printing on the surface of thin adhesive backed graphic sheets is less costly than having to print graphic designs on hard panels and the like associated with the prior art. Third, when an owner of mobile device charging stations 100, 200, 300 desires to change a particular graphic on the front of mobile device charging station 300, they can simply peel off the old graphic and apply a new graphic without having to replace hard panels, frame members, and the like with newly printed hard panels, frame members, etc.

FIG. 10B is a perspective view of graphic sheet 1002 adhered to the front surface of the mobile device charging stations 100, 200, 300. As shown, holes 124, 224 may be formed through graphic sheet 1002 after it is applied, adhered, or affixed to the front surface of mobile device charging stations 100, 200, 300.

Figure 10C:
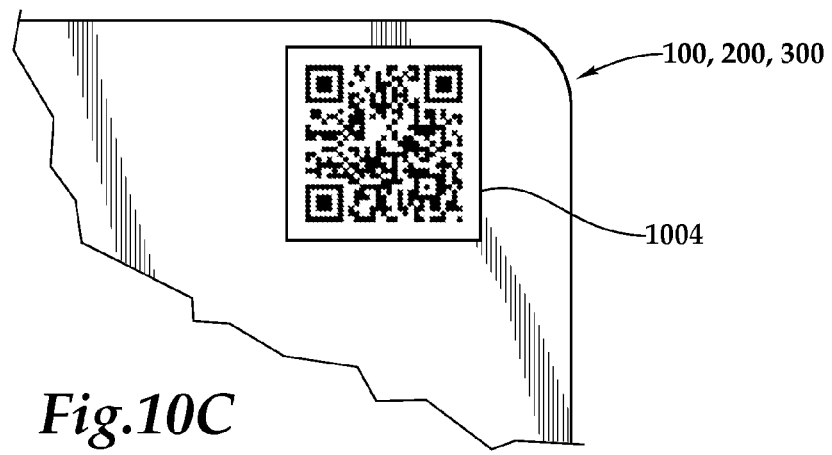
FIG. 10C is a partial view of a mobile device charging station having a QR code disposed thereon according to an embodiment.

Turning now to FIG. 10C is a partial view of mobile device charging stations 100, 200, 300 including a quick response ("QR") code 1004. QR code 1004 may be disposed anywhere on mobile device charging stations 100, 200, 300 for the purpose of enabling a user of mobile device charging stations 100, 200, 300 to quickly be sent to a website associated with QR code 1004, such as a website containing additional information related to the business where mobile device charging stations 100, 200, 300 are located, advertising disposed on graphic sheet 1002, and the like. QR code 1004 may be printed on graphic sheet 1002 during printing of graphic sheet 1002 prior to adhering to mobile device charging stations 100, 200, 300 or it may be disposed on mobile device charging stations 100, 200, 300 after graphic sheet 1002 has already been applied to mobile device charging stations 100, 200, 300. QR code 1004 is a matrix barcode that is commonly known to those skilled in the art. Preferably, mobile devices 110, 210, 310 may include an application for scanning or reading QR code 1004. A user of mobile devices 110, 210, 310 operate the application to scan QR code 1004 and then a desired website may be presented to the display of mobile devices 110, 210, 310.

Figure 10D:
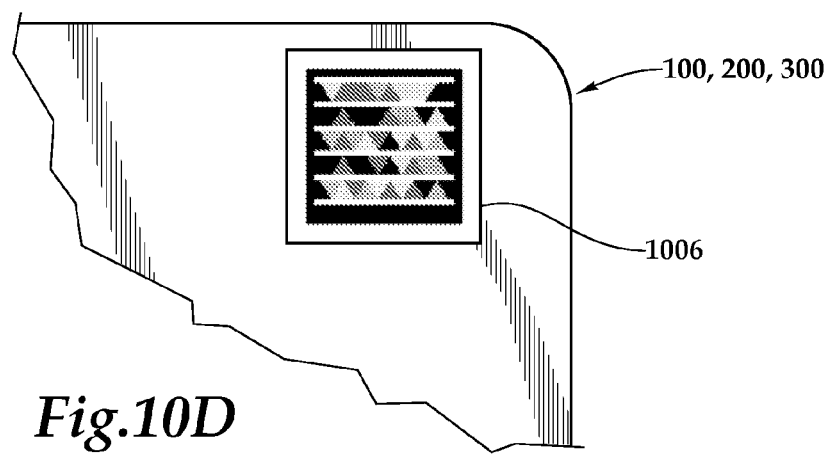
FIG. 10D is a partial view of a mobile device charging station having a high capacity color bar code disposed thereon according to an embodiment.

Referring now to FIG. 10D is a partial view of mobile device charging stations 100, 200, 300 including a high capacity color barcode ("HCCB") 1006. Similar to QR code 1004, HCCB 1006 may be disposed anywhere on mobile device charging stations 100, 200, 300 for the purpose of enabling a user of mobile device charging stations 100, 200, 300 to quickly be sent to a website associated with HCCB 1006, such as a website containing additional information related to the business where mobile device charging stations 100, 200, 300 are located, advertising disposed on graphic sheet 1002, and the like. HCCB 1006 may be printed on graphic sheet 1002 during printing of graphic sheet 1002 prior to adhering to mobile device charging stations 100, 200, 300 or it may be disposed on mobile device charging stations 100, 200, 300 after graphic sheet 1002 has already been applied to mobile device charging stations 100, 200, 300. HCCB 1006 is a matrix barcode that is commonly known to those skilled in the art. Preferably, mobile devices 110, 210, 310 may include an application for reading HCCB 1006. A user of mobile devices 110, 210, 310 operate the application to scan HCCB 1006 and then a desired website may be presented to the display of mobile devices 110, 210, 310.

Figure 10E:
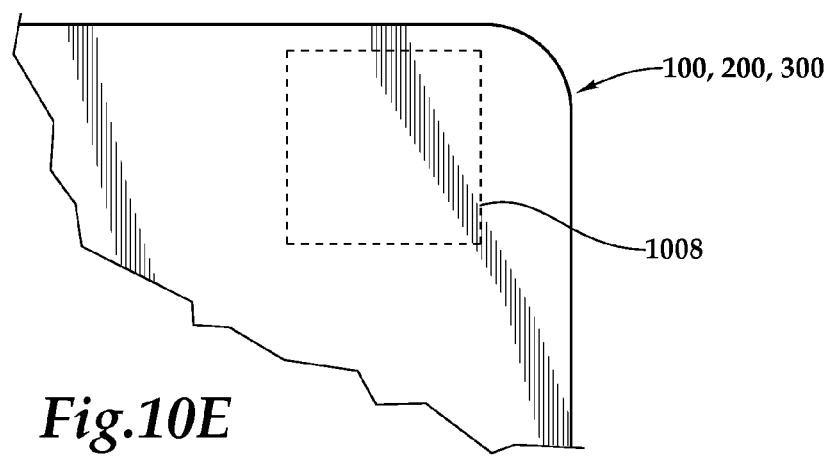
FIG. 10E is a partial view of a mobile device charging station having a near field communication module for communicating information to a mobile device according to an embodiment.

With reference to FIG. 10E, an embodiment of mobile device charging stations 100, 200, 300 including a near field communication ("NFC") module 1008 for communicating with mobile devices 110, 210, 310 for transmitting information to and from mobile device charging stations 100, 200, 300 and mobile devices 110, 210, 310. In one embodiment, a user of mobile device charging stations 100, 200, 300 may store particular information about themselves on their mobile devices 110, 210, 310. An application is run on mobile devices 110, 210, 310 that enables them to communicate wirelessly with mobile device charging stations 100, 200, 300 to communication the particular information stored on mobile devices 110, 210, 310.

Figure 11A:
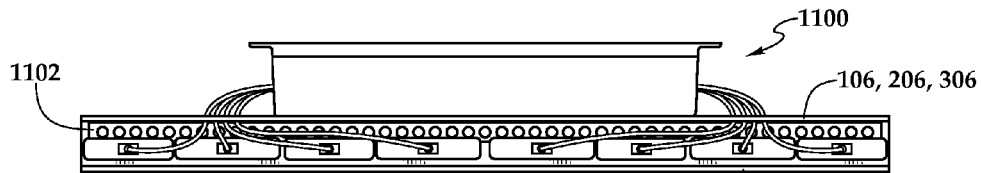
FIG. 11A is a top view of the mobile device charging station of FIGS. 1C, 2C, and 3 having lighting devices disposed on the upper surface of the channel for lighting a graphic disposed on the mobile device charging station of FIGS. 1A, 2A, and 3 according to an embodiment.

Turning now to FIG. 11A a non-limiting, exemplary mobile device charging stations 100, 200, 300 including lighting devices are depicted embodying principles of the present mobile device charging stations that is representatively illustrated and generally designated 1100. In this embodiment, mobile device charging stations 100, 200, 300 may further include lighting device 1102 that may be disposed on the upper surface of lower members 104, 204, 304 for lighting the graphic sheet or image that is disposed on the front surface of mobile device charging stations 100, 200, 300. In one aspect, lighting device 1102 may be disposed substantially adjacent to the junction of the upper surface of lower members 104, 204, 304 and the rear members 106, 206, 306 of mobile device charging stations 100, 200, 300 as shown in FIG. 11A. Additionally, lighting device 1102 may partially or fully extend across the entire length of lower members 104, 204, 304. Lighting device 1102 may be powered by power jack 606 of PCB 602, in one embodiment. Lighting device 1102 may be any type of lighting device including light emitting diodes ("LEDs"), organic light emitting diodes ("OLEDs"), lasers, and the like. Typically, these lighting devices may be low power lighting devices. Additionally, lighting device 1102 may include a plurality of these types of lighting devices into a lighting strip as shown in FIG. 11A.

Figure 11B:
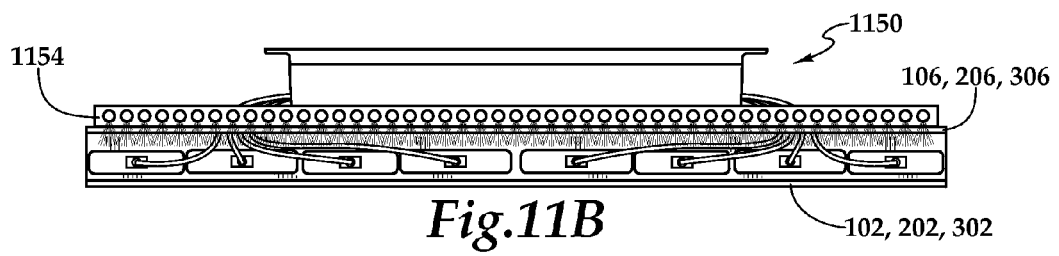
FIG. 11B is a top view of the mobile device charging station of FIGS. 1C, 2C, and 3 having lighting devices disposed on or within rear member for backlighting a graphic disposed on the mobile device charging station of FIGS. 1A, 2A, and 3 according to an embodiment.

Turning now to FIG. 11B a non-limiting, exemplary mobile device charging stations 100, 200, 300 including backlighting devices are depicted embodying principles of the present mobile device charging stations that is representatively illustrated and generally designated 1150. In this embodiment, mobile device charging stations 100, 200, 300 may further include backlighting device 1154 that may be disposed on the rear surface 122 of rear members 106, 206, 306 for backlighting the graphic sheet, graphic panel, or image that is disposed on rear members 106, 206, 306 of mobile device charging stations 100, 200, 300. In one aspect, backlighting device 1154 may be disposed substantially within rear members 106, 206, 306 and/or housings 128, 228 of mobile device charging stations 100, 200, 300 as shown in FIG. 11B. Additionally, backlighting device 1154 may partially or fully extend any portion of rear members 106, 206, 306, including around the partial or entire perimeter of rear members 106, 206, 306. Backlighting device 1154 may be powered by power jack 606 of PCB 602, in one embodiment. Backlighting device 1154 may be any type of lighting device including light emitting diodes ("LEDs"), organic light emitting diodes ("OLEDs"), liquid crystal displays ("LCDs"), lasers, fluorescent lights, incandescent lights, and the like. Typically, these lighting devices may be low power lighting devices. Additionally, lighting device 1154 may include a plurality of these types of lighting devices into a lighting strip that is incorporated into any portion of rear members 106, 206, 306, in one aspect.

In this embodiment, backlighting device 1154 provides a light source for transmitting light from the back of rear members 106, 206, 306 through to the front of rear members 106, 206, 306, thus backlighting any type of graphical material displayed on rear members 106, 206, 306 of mobile device charging stations 100, 200, 300. Rear members 106, 206, 306 may include slots or channels for supporting removable graphical material that that may be placed within rear members 106, 206, 306 for being backlit to a user of mobile device charging stations 100, 200, 300. Preferably, a portion or all of rear members 106, 206, 306 is made of a material that enables light transmission for backlighting the graphical material to a user.

Figure 12:
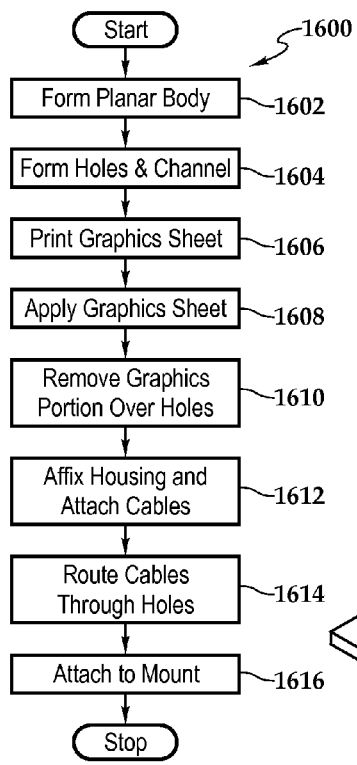
FIG. 12 is a side view of a stand disposed on the bottom of the mobile device charging station of FIGS. 1A, 2A, and 3 according to an embodiment.

Referring now to FIG. 12, a non-limiting, exemplary stand 1202 for supporting mobile devices is depicted embodying principles of the present mobile device charging stations that is representatively illustrated and generally designated 1200. Stand 1202 provides support for mobile device charging stations 100, 200, 300 in a tilted position. An angle θ is formed between stand 1202 and a substantially horizontal surface when mobile device charging stations 100, 200, 300 is positioned in a substantially vertical orientation as shown in FIG. 12. Positioning mobile device charging stations 100, 200, 300 slightly backward until stand 1202 is in flush contact with the horizontal surface will present mobile device charging stations 100, 200, 300 in an angled position from vertical equal approximately to angle θ from vertical for convenient viewing by users. Stand 1202 may be any type, form, or shape such that it provides an angled positioning of mobile device charging stations 100, 200, 300 when they are placed on the stand on a substantially horizontal surface. In one embodiment, stand 1202 is an angled piece of material that is affixed to the rear surface 122 of mobile device charging stations 100, 200, 300. In one aspect, stand 1202 may be made from any type of material, including the same or similar material as mobile device charging stations 100, 200, 300. Stand 1202 may be affixed to mobile device charging stations 100, 200, 300 by any type of fasteners, adhesives, adhesive tapes and the like as commonly known to those skilled in the arts.

Figure 13A:
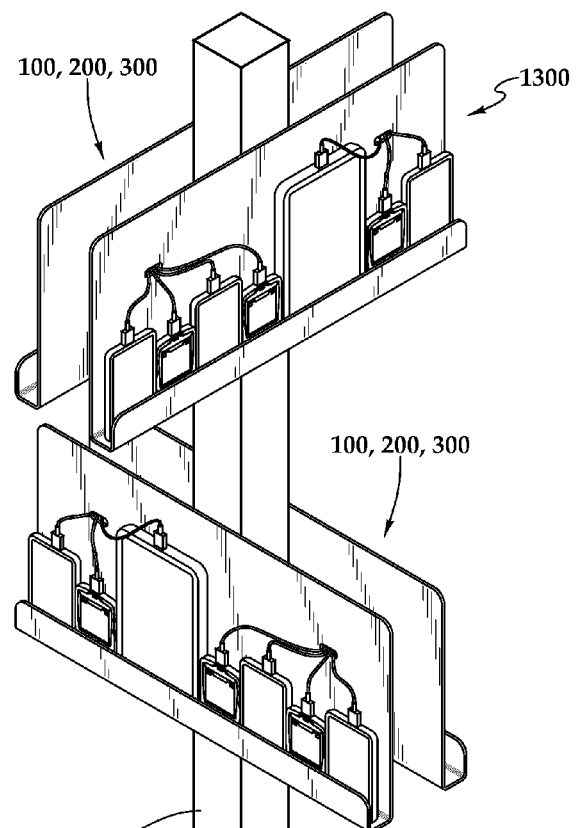
FIG. 13A is perspective view of a mobile device charging station of FIGS. 1A, 2A, and 3 disposed on a floor stand according to an embodiment.

Referring now to FIG. 13A, a non-limiting, exemplary stand for supporting mobile devices is depicted embodying principles of the present mobile device charging stations that is representatively illustrated and generally designated 1300. Stand 1300 includes a support 1302 and a base 1304 in one embodiment. In another embodiment, stand 1300 may or may not include base 1304. Stand 1300 depicts a support 1302 having a substantially square cross section, although support 1302 may have any type or form of cross section, such as cylindrical, hexagonal, etc. In one aspect, stand 1300 is shown supporting 4 mobile device charging stations 100, 200, 300. In another aspect, stand 1300 may support any number of mobile device charging stations 100, 200, 300. As shown in FIG. 13, rear members 106, 206, 306 of two mobile device charging stations 100, 200, 300 are affixed or attached to support 1302 such that their rear members 106, 206, 306 are opposing one another. Disposed lower on support 1302 are two additional mobile device charging stations 100, 200, 300 with their rear members 106, 206, 306 affixed or attached opposing one another. As shown, the upper two mobile device charging stations 100, 200, 300 may have an orientation different than the two mobile device charging stations 100, 200, 300 located below them. In one aspect, the upper and lower mobile device charging stations 100, 200, 300 may have similar orientations.

In yet another embodiment, support 1302 may be a cylindrical member having grooves or tracks disposed in it that run longitudinally along the outer surface of the cylindrical member. Any number of grooves or tracks may be incorporated into support 1302 for supporting any number of mobile device charging stations 100, 200, 300. For example, support 1302 may have 3 tracks disposed at substantially equal distances from each other such that three mobile device charging stations 100, 200, 300 may be affixed, attached, and/or mounted onto support 1302 in a triangular orientation. Additionally, a second set of mobile device charging stations 100, 200, 300 may be affixed, attached, and/or mounted below or above the first set of mobile device charging stations 100, 200, 300 for increasing the number of mobile device charging stations 100, 200, 300 disposed on one stand 1300. In yet another embodiment, support 1302 may be an existing column or support located at a location that may be used for mounting any number of mobile device charging stations 100, 200, 300 onto it.

Figure 13B:
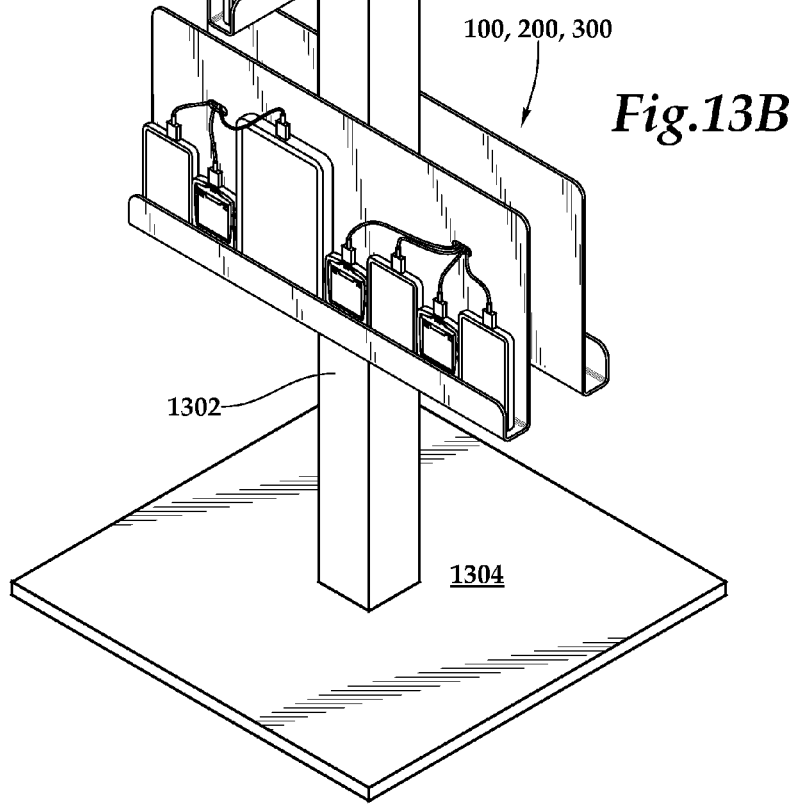
FIG. 13B is perspective view of a mobile device charging station of FIGS. 1A, 2A, and 3 disposed on a floor stand including a photovoltaic panel according to an embodiment.

Referring now to FIG. 13B, a non-limiting, exemplary stand for supporting mobile devices having a photovoltaic panel is depicted embodying principles of the present mobile device charging stations that is representatively illustrated and generally designated 1350. Photovoltaic panel 1352 produces electricity when exposed to certain light, such as sunlight. Photovoltaic panel 1352 is shown attached to the top of support 1302 in FIG. 13B, but photovoltaic panel 1352 may be included on any parts of any of the stands herein described. Further, photovoltaic panel 1352 may be incorporated directly onto any surface of mobile device charging stations 100, 200, 300 for providing power to PCB 602, battery pack 614, and/or batteries 616. For example, photovoltaic panel 1352 may be disposed on any portions of housings 128, 228, front members, 102, 202, 302, and/or rear members 106, 206, 306 of mobile device charging stations 100, 200, 300.

Preferably, stand 1202, stand 1300, wall mount 1400, and/or mobile device charging stations 100, 200, 300 may include additional supports for supporting photovoltaic panel 1352 in any desirable orientation for maximum exposure to a light source, such as sunlight. As discussed above, photovoltaic panel 1352 may be directly incorporated into any surface of stand 1202, stand 1300, wall mount 1400, and/or mobile device charging stations 100, 200, 300 without the use of mounts, and the like. Likewise, mobile device charging stations 100, 200, 300 may include leads, wires, connectors, and the like for connecting with photovoltaic panel 1352 for powering PCB 602, battery pack 614, and/or batteries 616.

Mobile device charging stations 100, 200, 300 may include any number of photovoltaic panels 1352 necessary for meeting the power requirements of mobile device charging stations 100, 200, 300 in charging mobile devices 110, 210, 310. Photovoltaic panel 1352 may be any type of photovoltaic panel, cell, and/or modules as are commonly known to those skilled in the arts.

Turning now to FIGS. 14A-14B, a non-limiting, exemplary wall mount for supporting mobile devices is depicted embodying principles of the present mobile device charging stations that is representatively illustrated and generally designated 1400. Wall mount 1400 include a substantially planar member 1402 for mounting against a surface, such as a wall, column, etc. Preferably, wall mount 1400 further includes one or more side slots 1404 that disposed at the outer edges of planar member 1402 and extending back inward slightly over planar member 1402 as shown in FIG. 14B. Side slots 1404 are for accepting flanges 136, 236 of mobile device charging stations 100, 200, 300. Additionally, wall mount 1400 preferably includes a stop 1406 that is part of or disposed substantially near the lower edge of planar member 1402 for supporting mobile device charging stations 100, 200, 300 when flanges 136, 236 are slid into side slots 1404.

Planar member 1402 preferably includes one or more security tab 1408 for securing mobile device charging stations 100, 200, 300 once they have been positioned into wall mount 1400. Planar member 1402 may be a tabbed or extended portion of planar member 1402 that further includes one or more holes formed therein. In one embodiment, security tab 1408 may be disposed on or near the upper edge of planar member 1402. Once mobile device charging stations 100, 200, 300 are positioned within wall mount 1400, a fastener, lock, and the like may be inserted into security tab 1408 for securing mobile device charging stations 100, 200, 300 into wall mount 1400, thus preventing or impeding unauthorized removal of mobile device charging stations 100, 200, 300 from wall mount 1400.

In another embodiment, side slots 1404, stop 1406, and security tab 1408 may be disposed on other edges of wall mount 1400 for providing sideways or upwards insertion of mobile device charging stations 100, 200, 300 into wall mount 1400. Wall mount 1400 may have any orientation or location of side slots 1404, stop 1406, and security tab 1408 as desired for providing support of mobile device charging stations 100, 200, 300.

In one aspect, wall mount 1400 may include one or more mounting holes 1410 for using with fasteners, such as screws and the like, for securing wall mount 1400 to a surface, such as a wall, column, etc. Once secured to a surface with fasteners, wall mount 1400 is then ready for inserting flanges 136, 236 of mobile device charging stations 100, 200, 300 into corresponding side slots 1404. By inserting flanges 136, 236 of mobile device charging stations 100, 200, 300 into corresponding side slots 1404, mobile device charging stations 100, 200, 300 are then slid downward in one embodiment until they come to rest against stop 1406. In this manner, mounting holes 1410 and associated fasteners are covered over and become inaccessible by the positioning of mobile device charging stations 100, 200, 300 over them.

In one embodiment, planar member 1402, side slots 1404, stop 1406 are separate pieces that may be joined into one wall mount 1400. In another embodiment, planar member 1402, side slots 1404, stop 1406 are a single or unitary piece of material that may be formed or bent to form side slots 1404 and stop 1406 from planar member 1402.

Figure 15A:
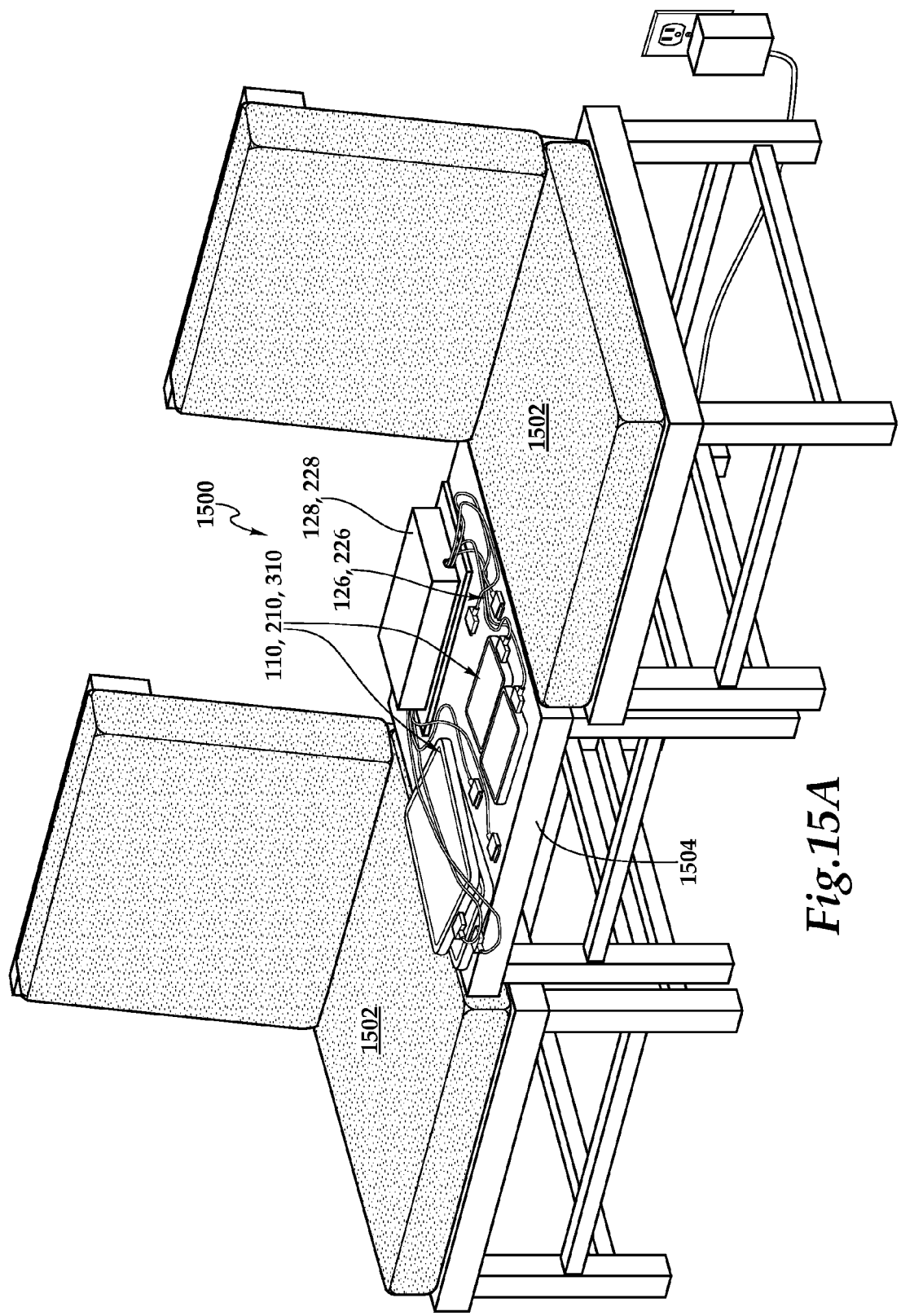
FIG. 15A is a perspective view of exemplary furniture having a mobile device charging station according to an embodiment.

Turning now to FIG. 15A, a non-limiting, exemplary piece of furniture for charging mobile devices is depicted embodying principles of the present mobile device charging stations that is representatively illustrated and generally designated 1500. In this embodiment, one or more mobile device charging stations 100, 200, 300 are incorporated into furniture pieces, such as a seating arrangement, including a chair 1502 and a table 1504. In one embodiment, one or more housings 128, 228 are disposed on the furniture, such as table 1504. Housings 128, 228 are shown disposed on top of table 1504, although, housings 128, 228 may be disposed on any portion of any piece of furniture. This embodiment include cables 126, 226 in communication with housings 128, 228 and extending about the upper or top surface of table 1504. Also shown are one or more mobile devices 110, 210, 310 connected to cables 126, 226 for charging as described herein.

Figure 15B:
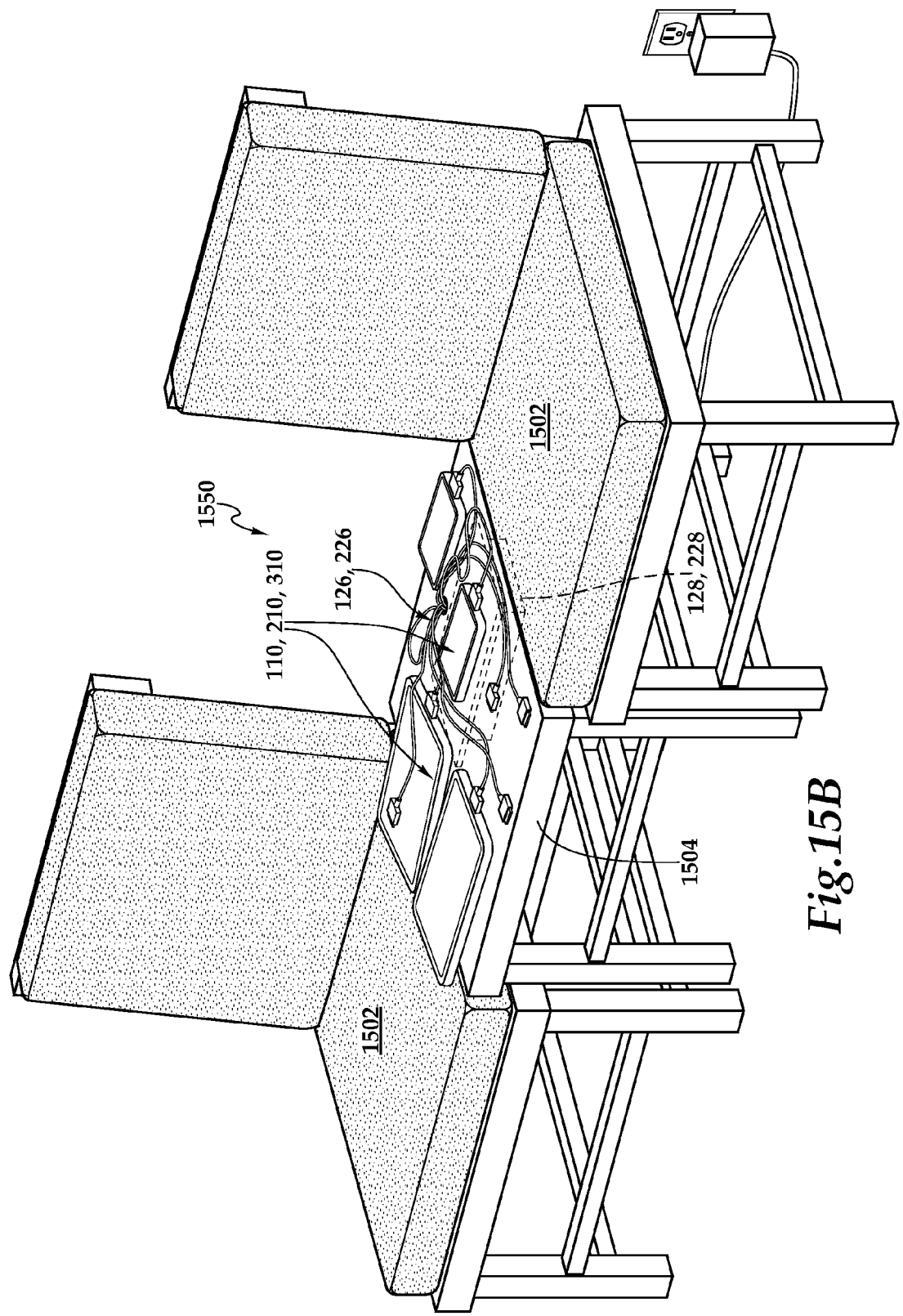
FIG. 15B is a perspective view of exemplary furniture having a mobile device charging station according to another embodiment.

Referring now to FIG. 15B, a non-limiting, exemplary piece of furniture for charging mobile devices is depicted embodying principles of the present mobile device charging stations that is representatively illustrated and generally designated 1550. In this embodiment, one or more mobile device charging stations 100, 200, 300 are incorporated into furniture pieces, such as a seating arrangement, including a chair 1502 and a table 1504. In one embodiment, one or more housings 128, 228 are disposed on the furniture, such as table 1504. Housings 128, 228 are shown disposed on the lower surface of table 1504. This embodiment include cables 126, 226 in communication with housings 128, 228 and extending about the upper or top surface of table 1504. Also shown are one or more mobile devices 110, 210, 310 connected to cables 126, 226 for charging as described herein. In this embodiment, cables 126, 226 may extend around a side or surface of table 1504 for connecting with one or more mobile devices 110, 210, 310 disposed on top of table 1504. In another embodiment, cables 126, 226 may extend through a hole disposed through table 1504 for connecting with one or more mobile devices 110, 210, 310 disposed on top of table 1504.

Although two different embodiments 1500, 1550 have been described above, mobile device charging stations 100, 200, 300, housings 128, 228, and/or cables 126, 226 may be incorporated partially or fully into any furniture, household items, commercial items, and the like. Mobile device charging stations 100, 200, 300, housings 128, 228, and/or cables 126, 226 may be incorporated into the rear, back, front, underside, etc. surfaces of any piece of furniture for charging one or more mobile devices 110, 210, 310. For example, mobile device charging stations 100, 200, 300, housings 128, 228, and/or cables 126, 226 may be incorporated into the back portion of a couch or chair such that cables 126, 226 extend outward for charging one or more mobile devices 110, 210, 310.

Figure 16:
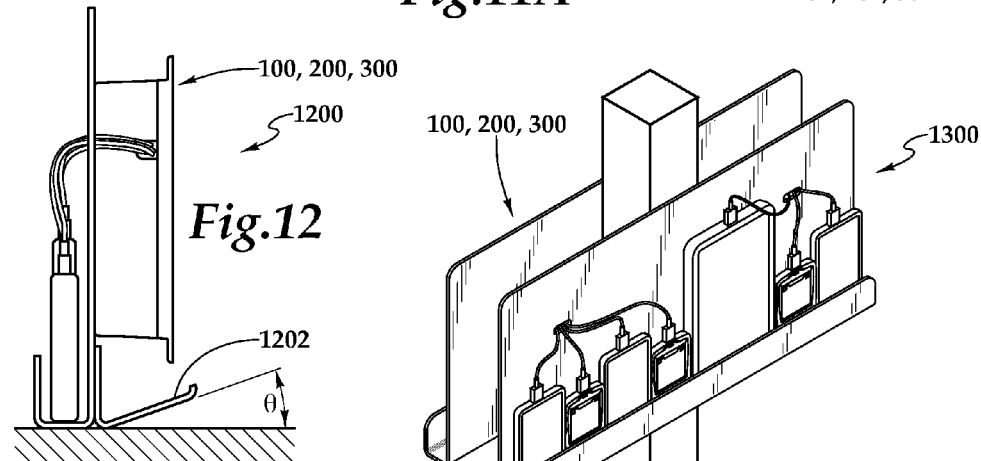
FIG. 16 is a flowchart of a process for fabricating mobile device charging stations according to an embodiment.

The present mobile device charging stations 100, 200, 300 further include methods for fabricating mobile device charging stations 100, 200, 300. With reference to FIG. 16, an embodiment of a method for fabricating mobile device charging stations 100, 200, 300 is schematically illustrated and generally designated 1600. In step 1602, a piece of material, such as a substantially planar piece of material is cut or formed by known methods such as cutting, sawing, laser cutting, and the like. In step 1604, holes 124, 224 and channels 108, 208, 308 are formed. This step may include bending or forming the material to form channels 108, 208, 308. Drills, routers and the like may be used to form holes 124, 224.

In step 1606, a graphics image is produced for applying to the front surfaces of mobile device charging stations 100, 200, 300. This step may include using a graphics program on a computer to produce graphic sheet 1002 of a desired look and dimensions. This step may include receiving a graphics image over the Internet from an entity that wishes to have a particular graphic printed on graphic sheet 1002 for applying on a particular mobile device charging stations 100, 200, 300. This step may further include sending the graphics file to a printer, commercial printer, and the like that may use graphics quality printing sheets with removable adhesive protective covers on the back. Some exemplary graphics sheet material may include Orajet™ by RapidAir™, for example. This step may further include printing several graphic sheet 1002 at one time and then separating them by a cutting and/or trimming process as is known to those skilled in the art.

In step 1608, graphic sheet 1002 is applied to front surfaces 120, 220 of mobile device charging stations 100, 200, 300. This step may include removing the protective covering on the back of graphic sheet 1002 to expose adhesive material on the back of graphic sheet 1002. Graphic sheet 1002 may then be lined up with one edge of front surfaces 120, 220 and applied across front surfaces 120, 220 of mobile device charging stations 100, 200, 300. This step may include using a soft scraper to remove air bubbles as graphic sheet 1002 is applied to front surfaces 120, 220. In one embodiment, the adhesive material backing on graphic sheet 1002 may contain small or tiny channels within the back surface of 1002 for enabling trapped air to escape while applying to eliminate any air bubbles being trapped once its applied.

In step 1610, portions of graphic sheet 1002 covering holes 124, 224 is removed by using cutting tools, razors, or other means as commonly known to those skilled in the art. This step may also include removing any excess graphic sheet 1002 covering front surfaces 120, 220 of mobile device charging stations 100, 200, 300.

In step 1612, housings 128, 228 may be affixed or joined to the rear surfaces 122, 222 of mobile device charging stations 100, 200, 300. This step may include using adhesive or adhesive tape and joining housings 128, 228 to mobile device charging stations 100, 200, 300. This step may further include disposing PCB 602 or any other PCB as herein described within housings 128, 228. This step may include using standoffs for providing some distance between the surface of housings 128, 228 and PCB 602 or other PCB as described herein. In step 1614, cables 126, 226 are then connected to the PCB and routed through holes 124, 224 for presenting the micro-USB, mini-USB, Apple connectors, and the like to the front of mobile device charging stations 100, 200, 300. This step may further include attaching covers 130, 230 to the back of housings 128, 228 for sealing the cables 126, 226 and PCB within housings 128, 228.

In step 1616, mobile device charging stations 100, 200, 300 may be mounted to any surface. This step may include attaching stand 1202 to the lower portion mobile device charging stations 100, 200, 300. This step may also include attaching wall mount 1400 to a surface and then attaching mobile device charging stations 100, 200, 300 to wall mount 1400 as described herein. This step may also include providing a stand 1300 of a desired size, height, and arrangement for attaching any number of mobile device charging stations 100, 200, 300 to stand 1300.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A floor stand for supporting one or more mobile device charging stations for charging a plurality of mobile devices, comprising:
   a vertical support member having an upper end and a lower end, wherein the one or more mobile device charging stations are supported on the vertical support member;
   each mobile device charging station for charging a plurality of mobile devices including:
   a panel having an upper end and a lower end and a substantially planar front face and a back face;
   a channel having a front portion spaced away from a plane of the substantially planar front face of the panel and a bottom portion substantially perpendicular to the front portion, with the bottom portion of the channel being adapted to support a plurality of mobile devices between the front portion of the channel and the substantially planar front face of the panel when the substantially planar front face of the panel is in a substantially upright position;
   an electronic circuit adapted for charging the plurality of mobile devices;
   a housing having a plurality of walls enclosing the electronic circuit, wherein the housing is attached to the panel; and
   a plurality of cables each having a first end enclosed by the housing and in electrical communication with the electronic circuit, each of the plurality of cables extending through an aperture in one of: (a) the panel or (b) one of the walls of the housing, with each of the plurality of cables having a length sufficient that a second end of the respective cable at least reaches a location substantially proximal to the channel, with the second end of each of the plurality of cables adapted for connecting with one of the plurality of mobile devices to deliver charge to the respective mobile device from the electronic circuit.

2. The floor stand of claim 1 further comprising:
   a base connected to lower end of the vertical support member for stabilizing the vertical support member in a substantially vertical position.

3. The floor stand of claim 1 further comprising a power supply for powering the one or more mobile device charging stations.

4. The floor stand of claim 1 further comprising one or more fasteners located on the vertical support member for fastening the one or more mobile device charging stations to the vertical support member.

5. The floor stand of claim 1, wherein the one or more mobile charging device stations are supported substantially about the upper end of the vertical support member.

6. The floor stand of claim 1, further comprising one or more tracks located on the vertical support member for slidably engaging with the one or more mobile device charging stations for providing adjustable mounting points for the one or more mobile device charging stations.

7. The floor stand of claim 1, further comprising one or more grooves located on the vertical support member for slidably engaging with the one or more mobile device charging stations for providing adjustable mounting points for the one or more mobile device charging stations.

8. A floor stand for supporting one or more mobile device charging stations for charging a plurality of mobile devices, comprising:
   a vertical support member having an upper end and a lower end;
   one or more mounts located about the vertical support for removably securing the one or more mobile device charging stations;
   wherein each mobile device charging station for charging a plurality of mobile devices includes:
   a panel having an upper end and a lower end and a substantially planar front face and a back face;
   a channel for supporting the plurality of mobile devices in a substantially vertical position, wherein the channel includes a front portion spaced away from a plane of the substantially planar front face of the panel and a bottom portion being adapted to support a plurality of mobile devices between the front portion of the channel and the substantially planar front face of the back panel when the substantially planar front face of the back panel is in a substantially upright position;
   an electronic circuit adapted for charging the a plurality of mobile devices;
   a housing having a plurality of walls enclosing the electronic circuit, wherein one of the plurality of walls comprises the back face of the housing; and
   a plurality of cables each having a first end enclosed by the housing and in electrical communication with the electronic circuit, with each of the cables extending through an aperture of the mobile device charging station located above the channel when the substantially planar front face of the panel is in a substantially upright position, with each of the plurality of cables extending in front of the substantially planar front face and having a length sufficient that a second end of the respective cable at least reaches a location substantially proximal to the channel, with the second end of each of the plurality of cables adapted for connecting with one of the plurality of mobile devices to deliver charge to the respective mobile device from the electronic circuit.

9. The floor stand of claim 8, wherein each of the one or more mounts comprises a substantially planar body having an upper end, a lower end, and two sides, the lower end having retention means for slidably securing the one or more mobile device charging stations.

10. The floor stand of claim 9 wherein one or more of the two sides has retention means for slidably securing the one or more mobile device charging stations.

11. The floor stand of claim 8 further comprising a power supply for powering the one or more mobile device charging stations.

12. The floor stand of claim 8 wherein the one or more mounts are located substantially on opposing sides of the vertical support.

13. The floor stand of claim 8 wherein the one or more mounts are located substantially above or below one another.

14. The floor stand of claim 8, further comprising one or more of the group consisting of tracks or grooves located on the vertical member for slidably engaging with the one or more mounts for providing adjustable mounting points for the one or more mobile device charging stations.

15. A mobile device charging station for charging a plurality of mobile devices, comprising:
a panel having an upper end and a lower end a substantially planar front face and a back face;
a channel having a front portion spaced away from the substantially planar front face of the panel and a bottom portion adapted to support a plurality of mobile devices between the front portion of the channel and the substantially planar front face when the back panel is in a substantially upright position;
an electronic circuit adapted for charging the plurality of mobile devices;
a housing having a plurality of walls enclosing the electronic circuit, wherein the back face of the panel comprises one of the walls of the housing; and
a plurality of cables each having a first end enclosed by the housing and in electrical communication with the electronic circuit, each of the plurality of cables extending through an aperture of the mobile device charging station located above the channel when the substantially planar front face of the panel is in a substantially upright position, with each of the plurality of cables extending in front of the substantially planar front face and having a length sufficient that a second end of the respective cable at least reaches a location substantially proximal to the channel, with the second end of each of the plurality of cables adapted for connecting with one of the plurality of mobile devices to deliver charge to the respective mobile device from the electronic circuit.

16. The mobile device charging station of claim 15 further comprising a power supply for powering the electronic circuit and providing charge to the plurality of mobile devices.

17. The mobile device charging station of claim 15, wherein the panel and the channel are formed from the same piece of material.

18. The mobile device charging station of claim 15, wherein the apertures are disposed proximal to substantially the upper end of the panel for routing the plurality of cables through.

19. The mobile device charging station of claim 15, wherein the channel has a depth of from about 1.25 to about 0.75 inches.

20. The mobile device charging station of claim 15, wherein the panel has a width of from about 8 to about 24 inches and a height of from about 6 to about 18 inches.

* * * * *